United States Patent
da Silva et al.

(10) Patent No.: US 12,406,196 B2
(45) Date of Patent: Sep. 2, 2025

(54) SYSTEM AND METHOD FOR DECENTRALIZED DISTRIBUTED MODEL ADAPTATION

(71) Applicant: EMC IP Holding Company LLC, Hopkinton, MA (US)

(72) Inventors: Pablo Nascimento da Silva, Niterói (BR); Hugo de Oliveira Barbalho, Rio de Janeiro (BR)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 1101 days.

(21) Appl. No.: 17/361,605

(22) Filed: Jun. 29, 2021

(65) Prior Publication Data

US 2022/0414498 A1 Dec. 29, 2022

(51) Int. Cl.
*G06N 5/04* (2023.01)
*G01C 21/00* (2006.01)
*G06F 16/23* (2019.01)
*G08G 1/01* (2006.01)

(52) U.S. Cl.
CPC .......... *G06N 5/04* (2013.01); *G01C 21/3885* (2020.08); *G01C 21/3896* (2020.08); *G06F 16/235* (2019.01); *G06F 16/2379* (2019.01); *G08G 1/0112* (2013.01); *G08G 1/0116* (2013.01)

(58) Field of Classification Search
CPC .......... G06N 5/04; G06N 3/045; G06N 3/084; G06N 3/09; G06N 3/094; G01C 21/3885; G01C 21/3896; G06F 16/235; G06F 16/2379; G08G 1/0112; G08G 1/0116; G08G 1/0133; G08G 1/096827
See application file for complete search history.

(56) References Cited

U.S. PATENT DOCUMENTS

| 10,200,457 B2* | 2/2019 | Shariat | H04L 67/10 |
| 2019/0114558 A1* | 4/2019 | Ogawa | G08G 1/161 |
| 2021/0263826 A1* | 8/2021 | Rosemarine | G06F 11/3409 |

* cited by examiner

*Primary Examiner* — Ajay M Bhatia
*Assistant Examiner* — Chongsuh Park
(74) *Attorney, Agent, or Firm* — Chamberlain Hrdlicka; Aly Z. Dossa

(57) ABSTRACT

An edge information handling system (IHS) manager includes a storage for storing a labeled data associated with a use counter; and a vehicle counter; and a processor. The processor is programmed to: update an inference module using the labeled data, determine, after the updating, whether the use counter of the labeled data has exceeded a current use threshold, and in response to the use counter of the labeled data exceeding the current use threshold, initiating replacing of the labeled data with new labeled data from a central IHS. The current use threshold is based on the vehicle counter.

19 Claims, 25 Drawing Sheets

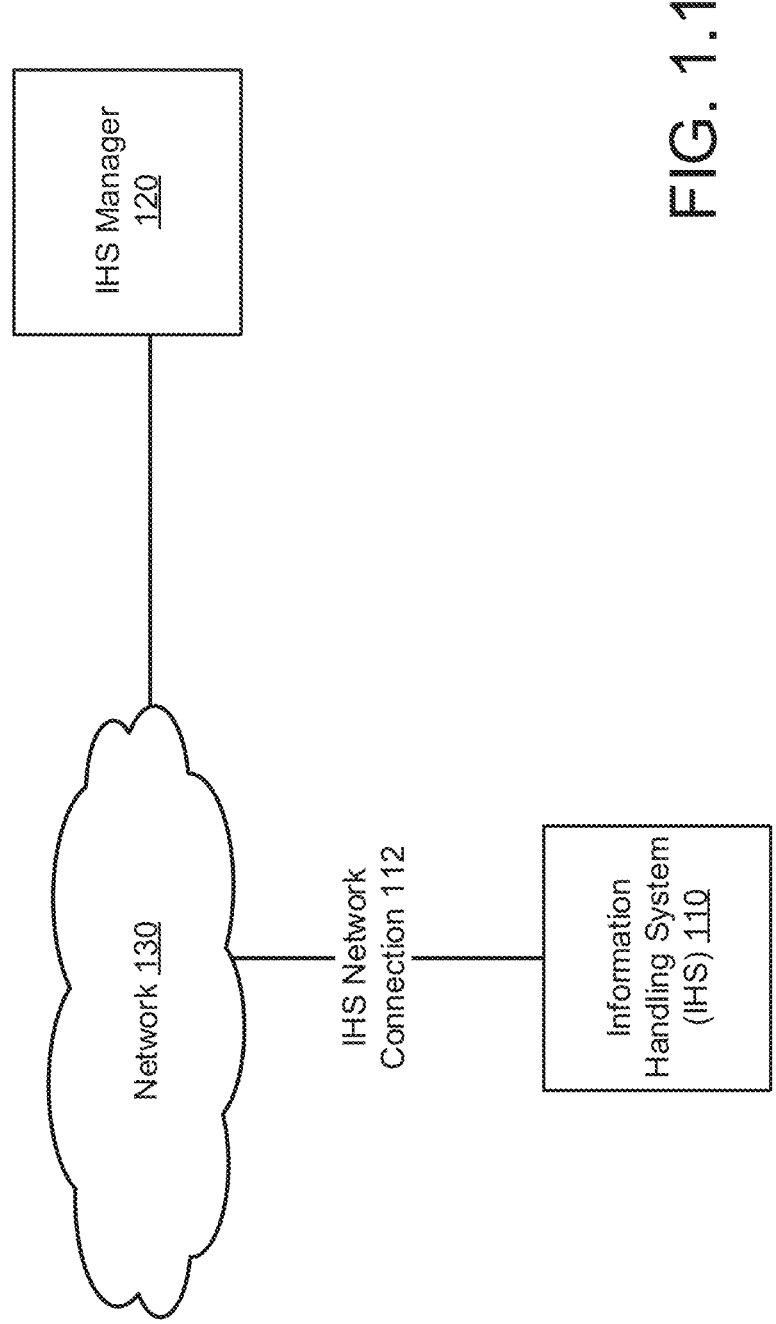
FIG. 1.1

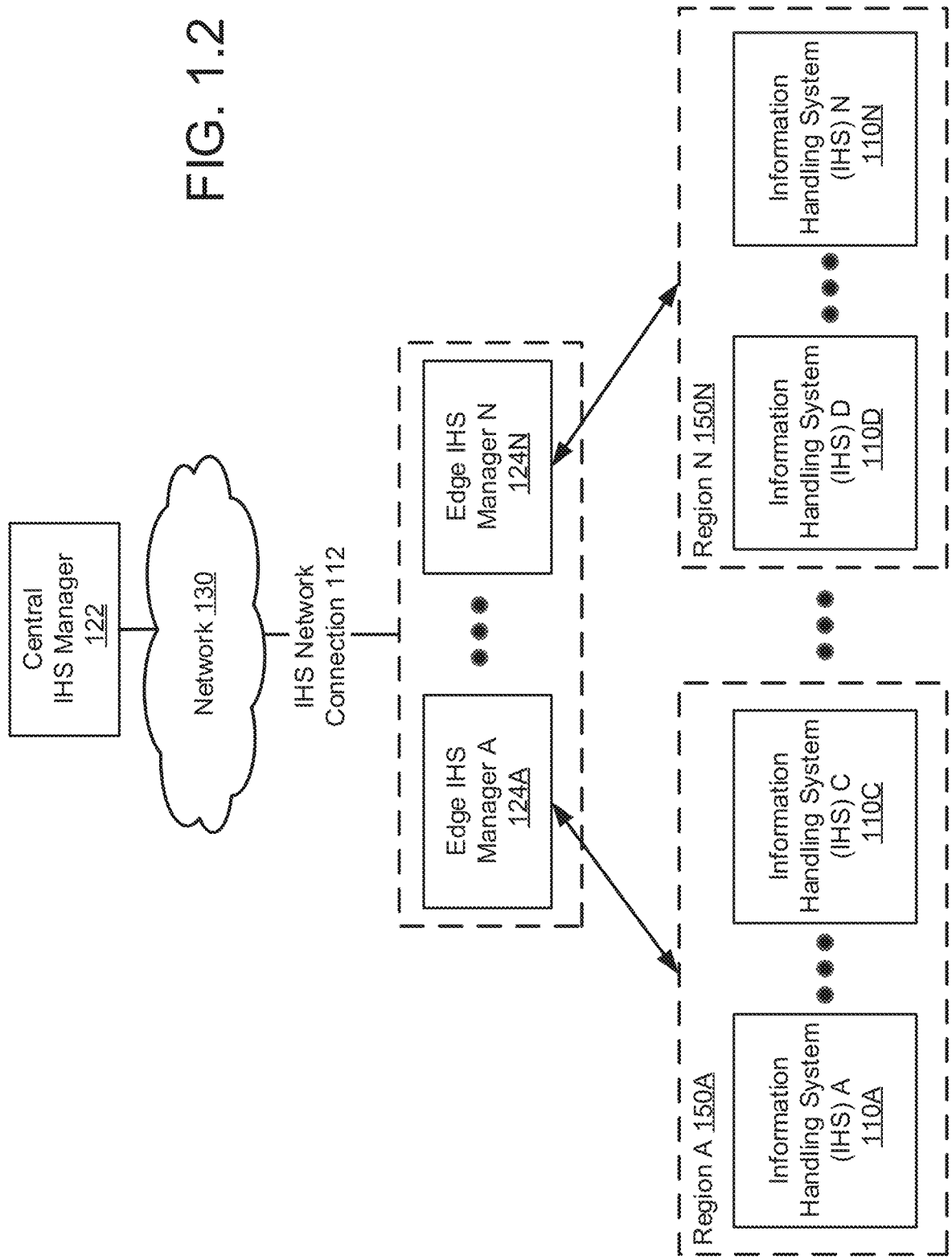
FIG. 1.2

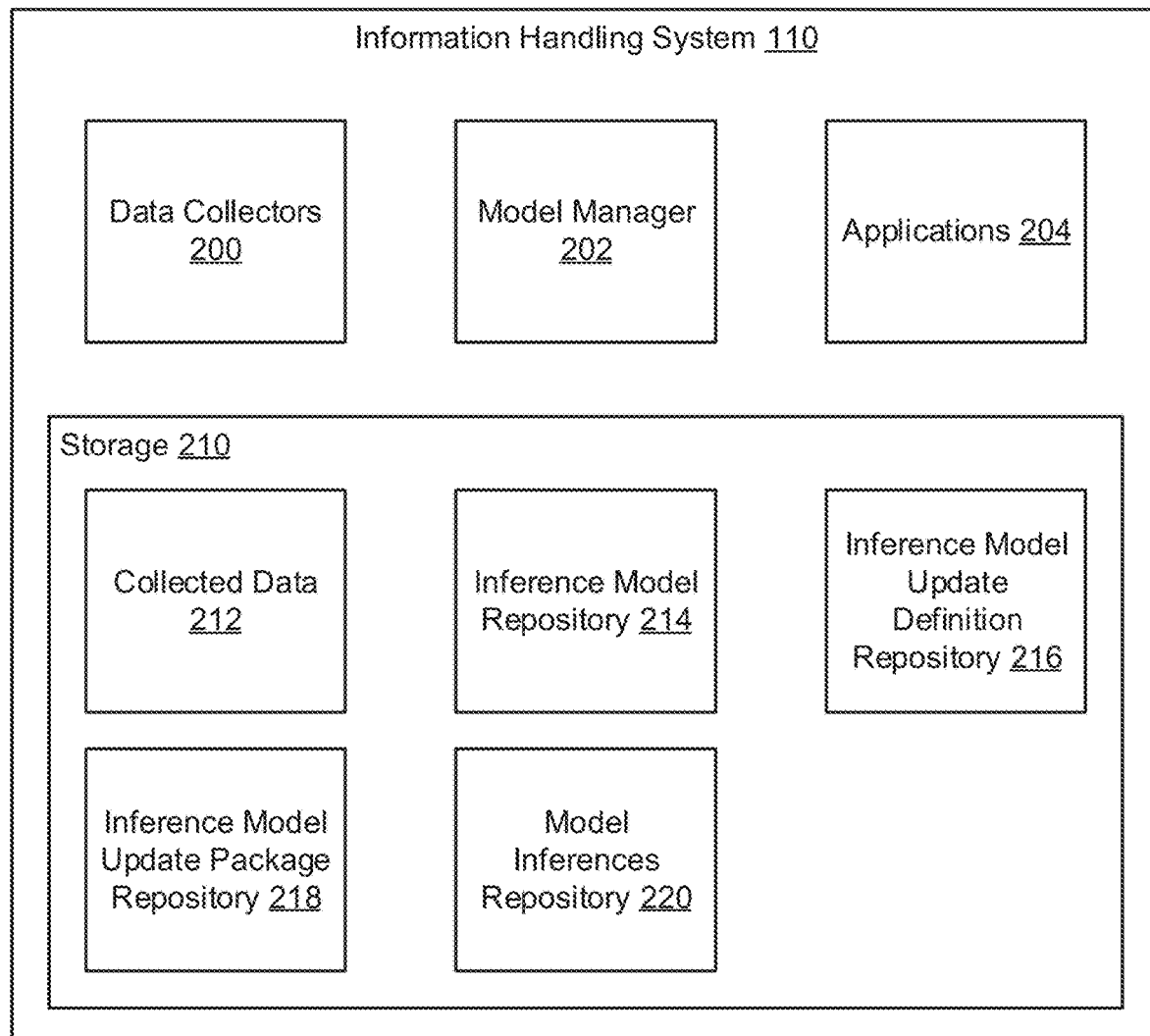
FIG. 2.1

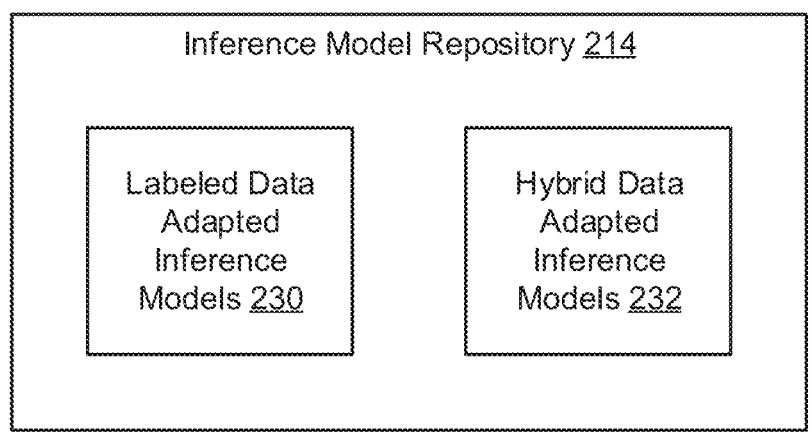
FIG. 2.2

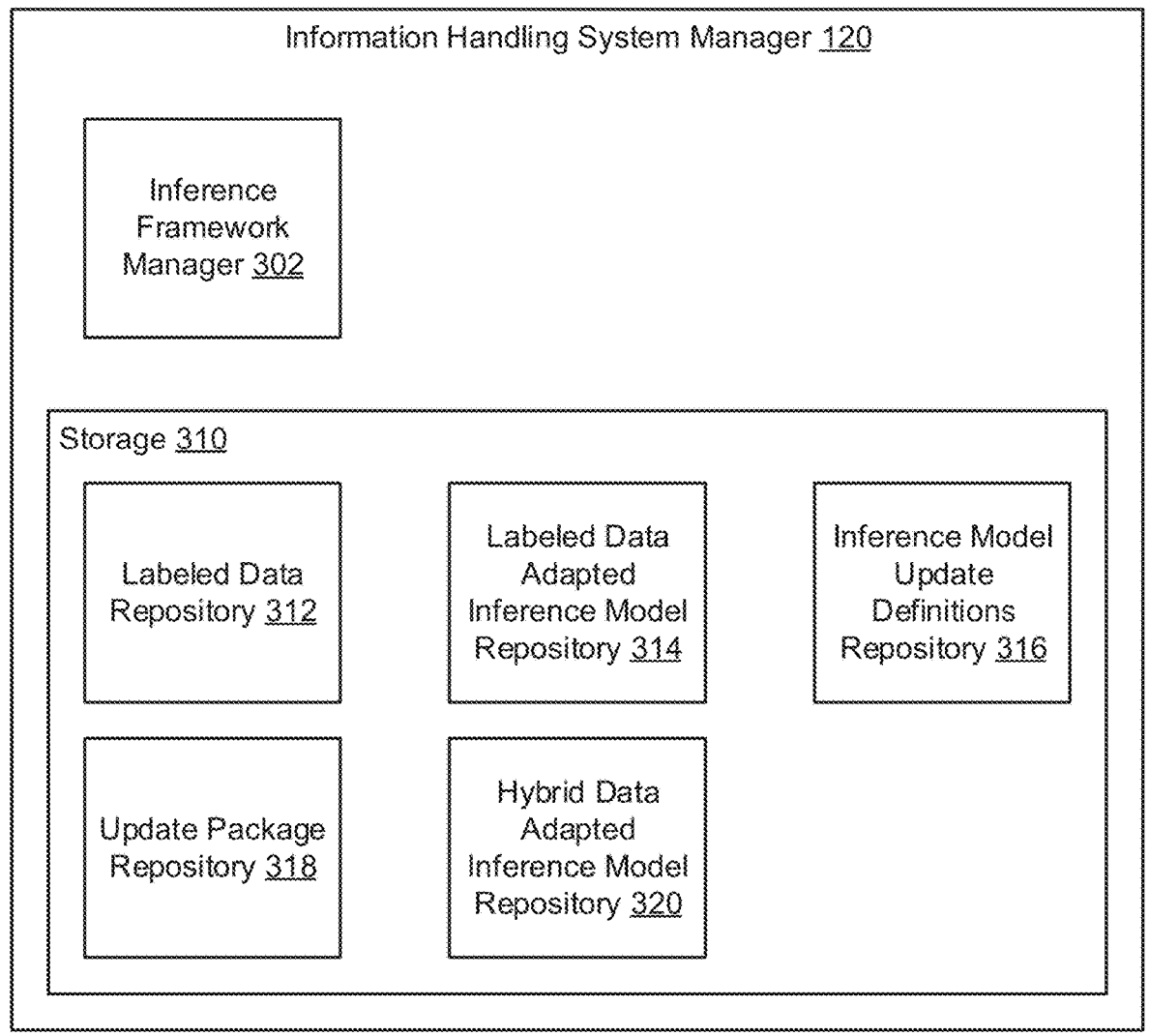
FIG. 3.1

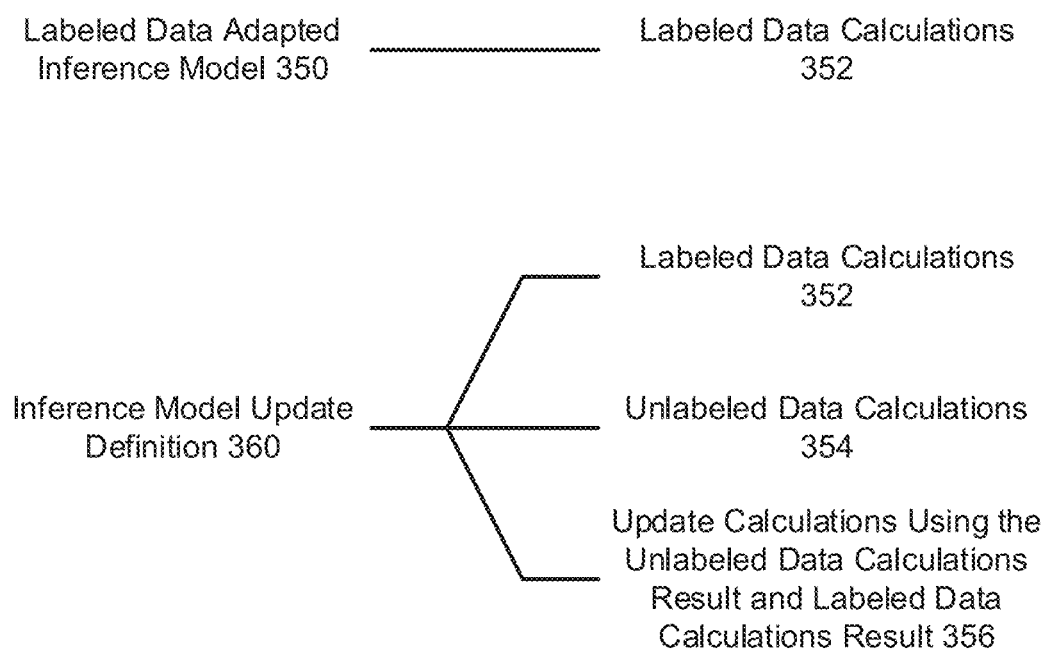
FIG. 3.2

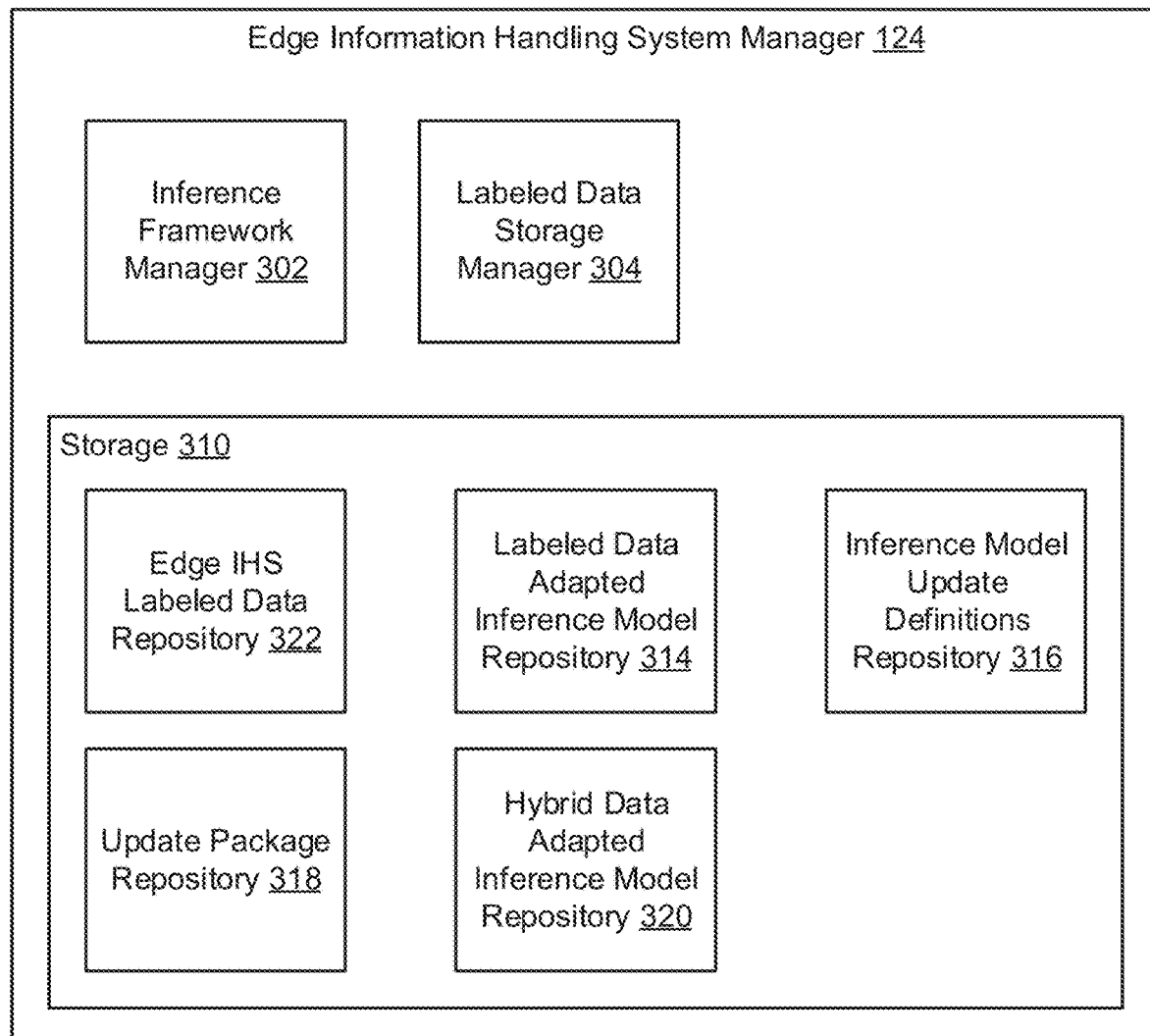
FIG. 3.3

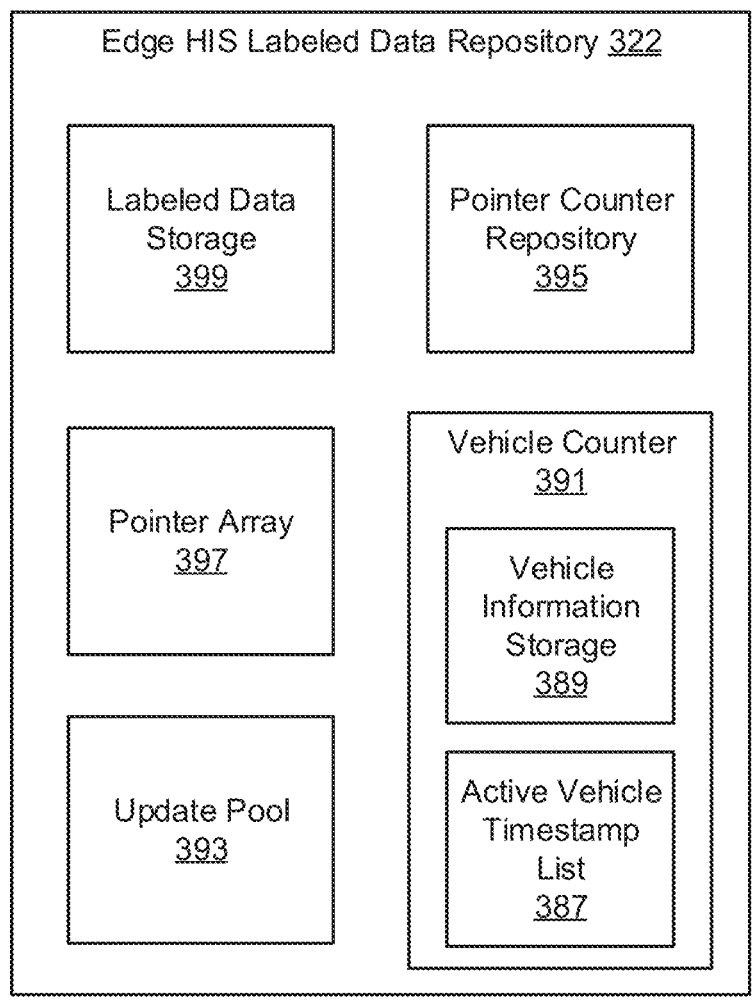
FIG. 3.4

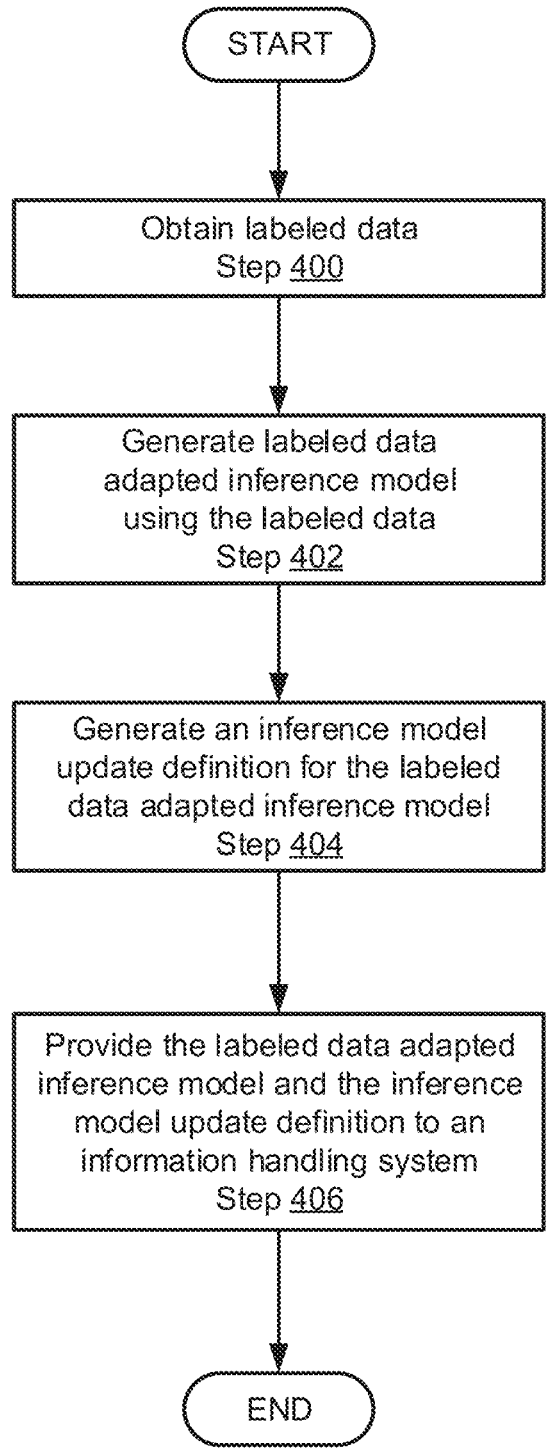
FIG. 4.1

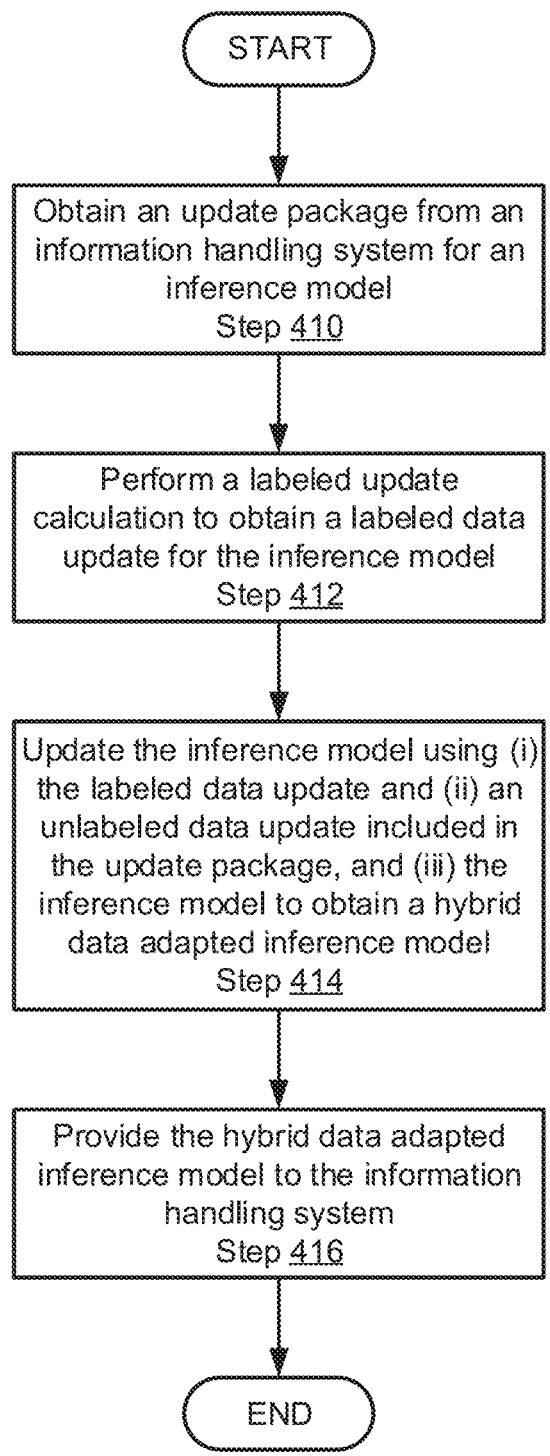
FIG. 4.2

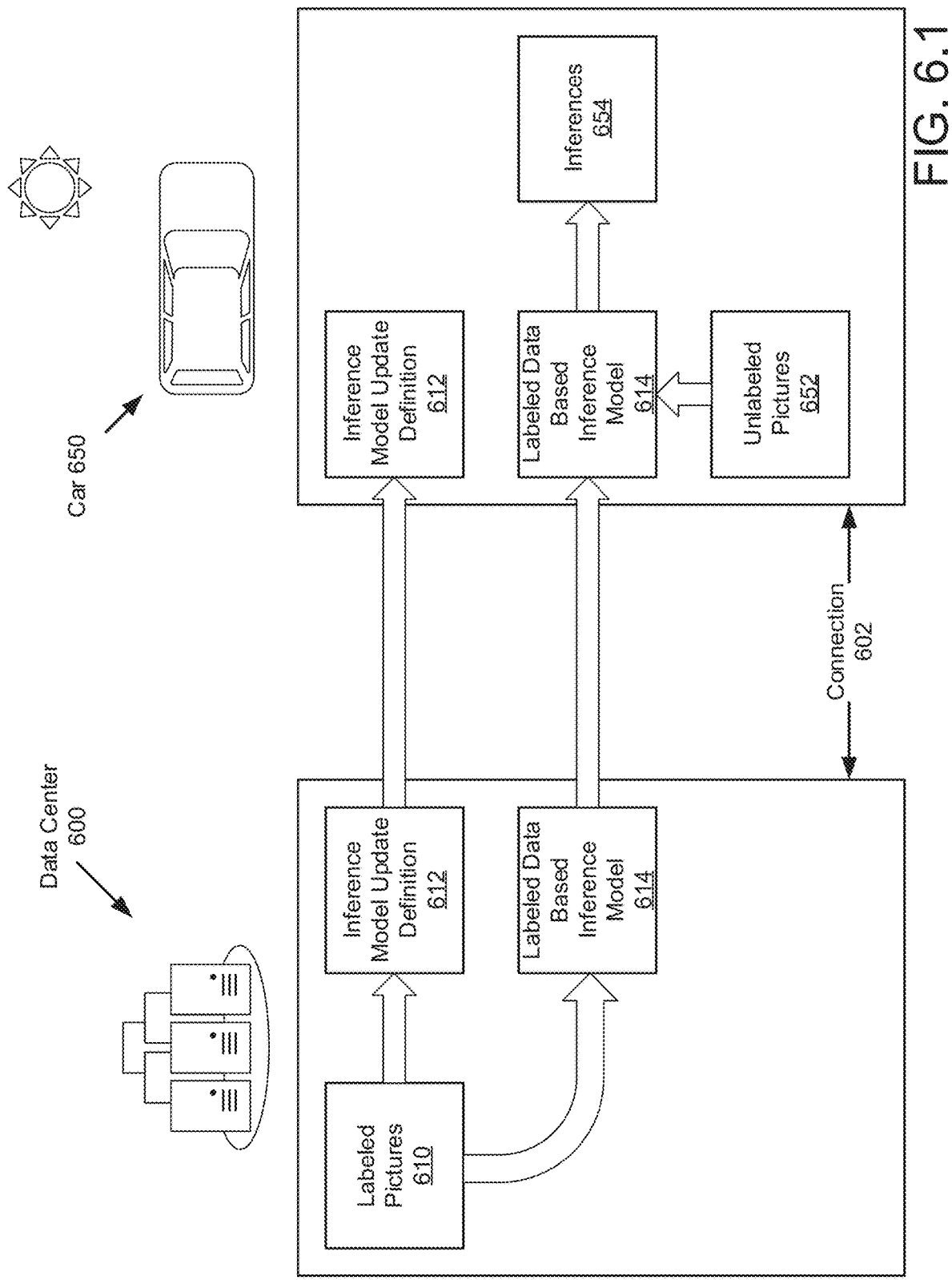
FIG. 6.1

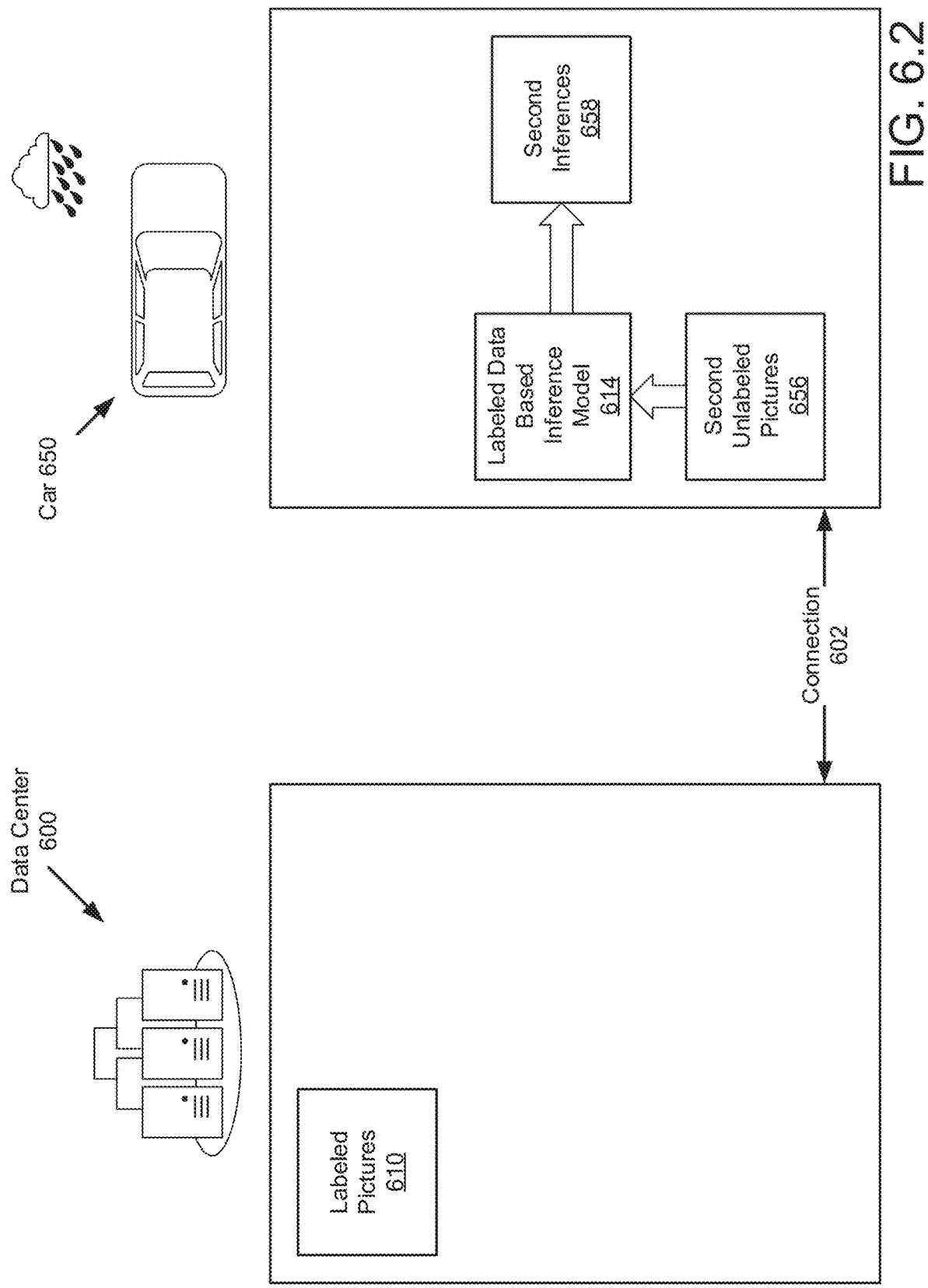

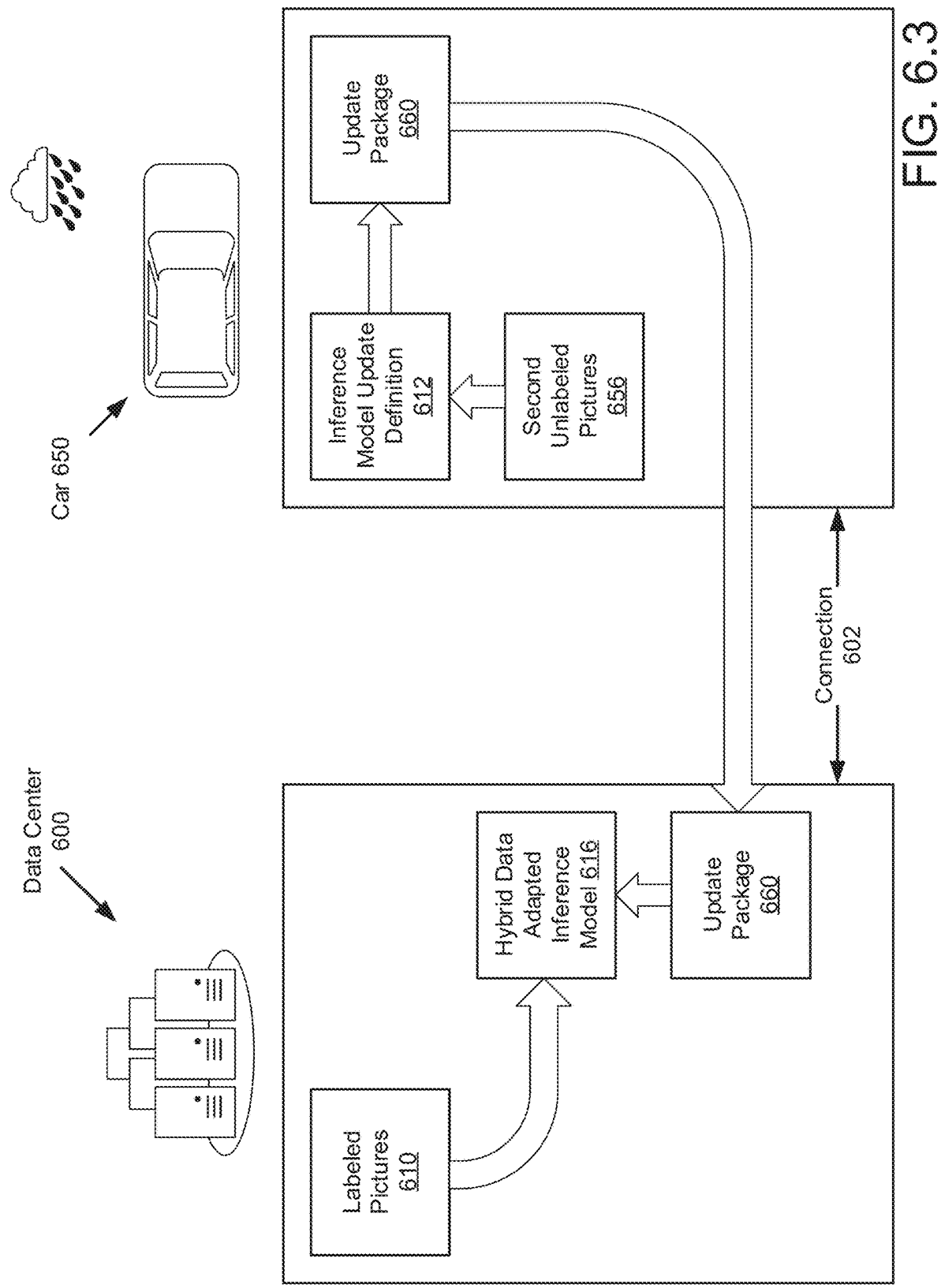

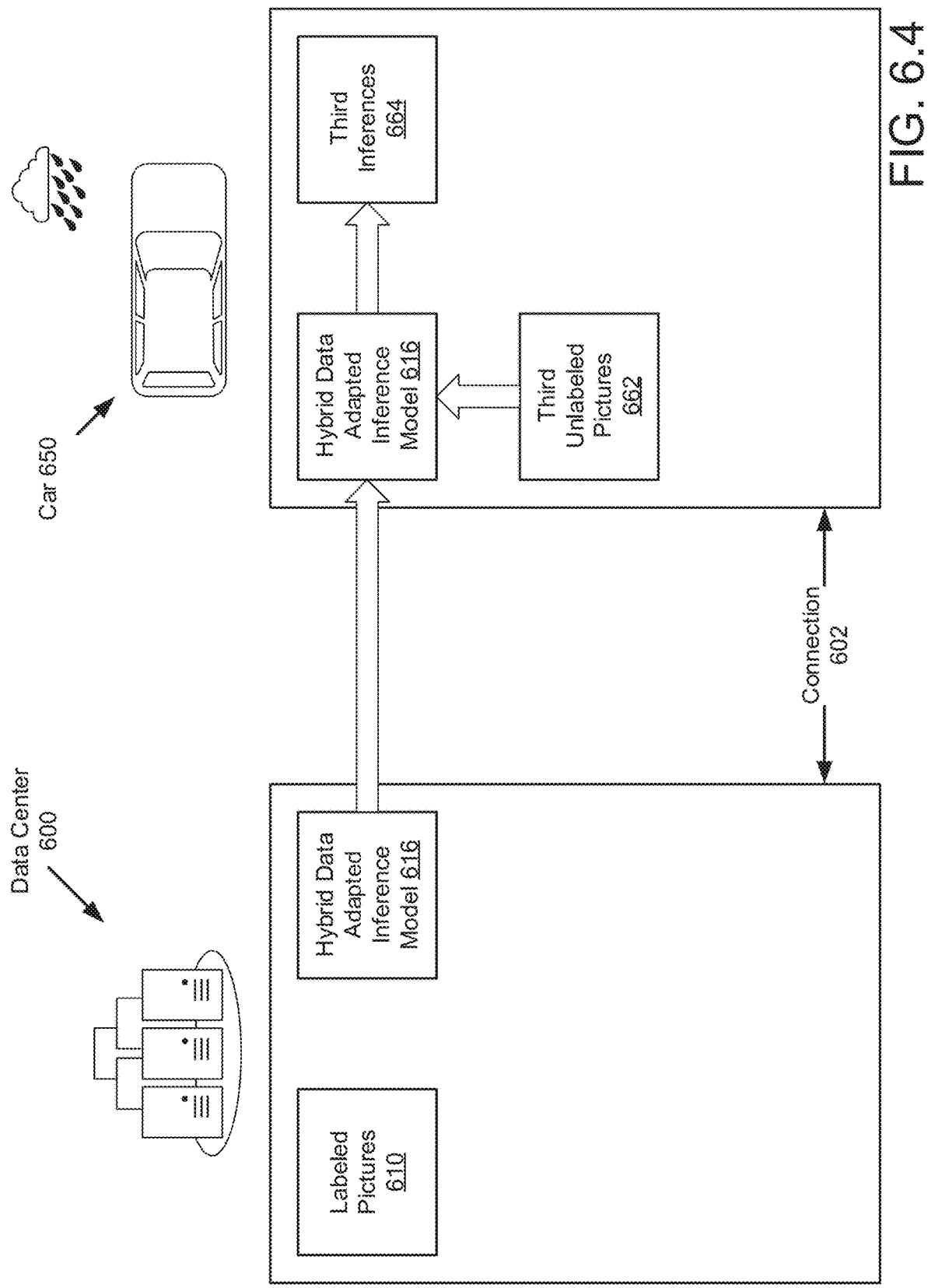
FIG. 6.4

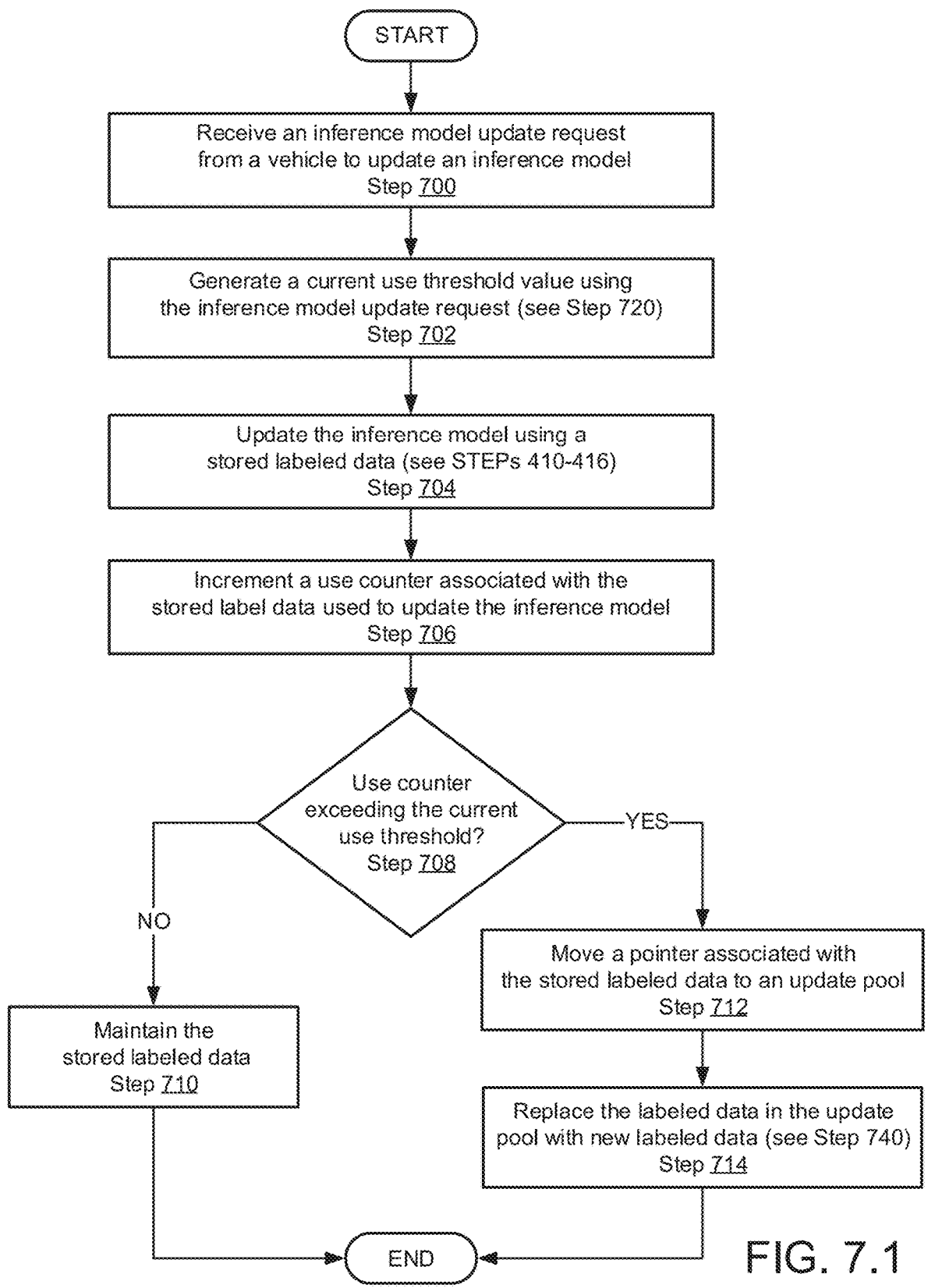
FIG. 7.1

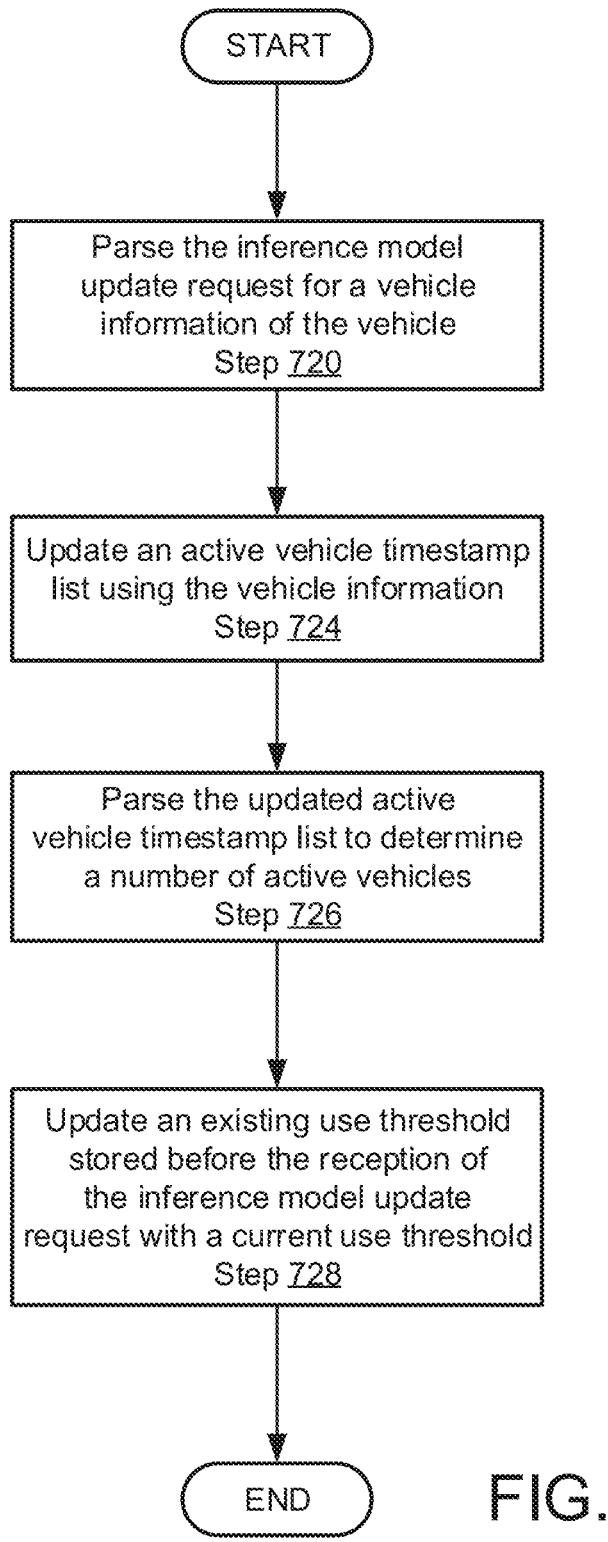
FIG. 7.2

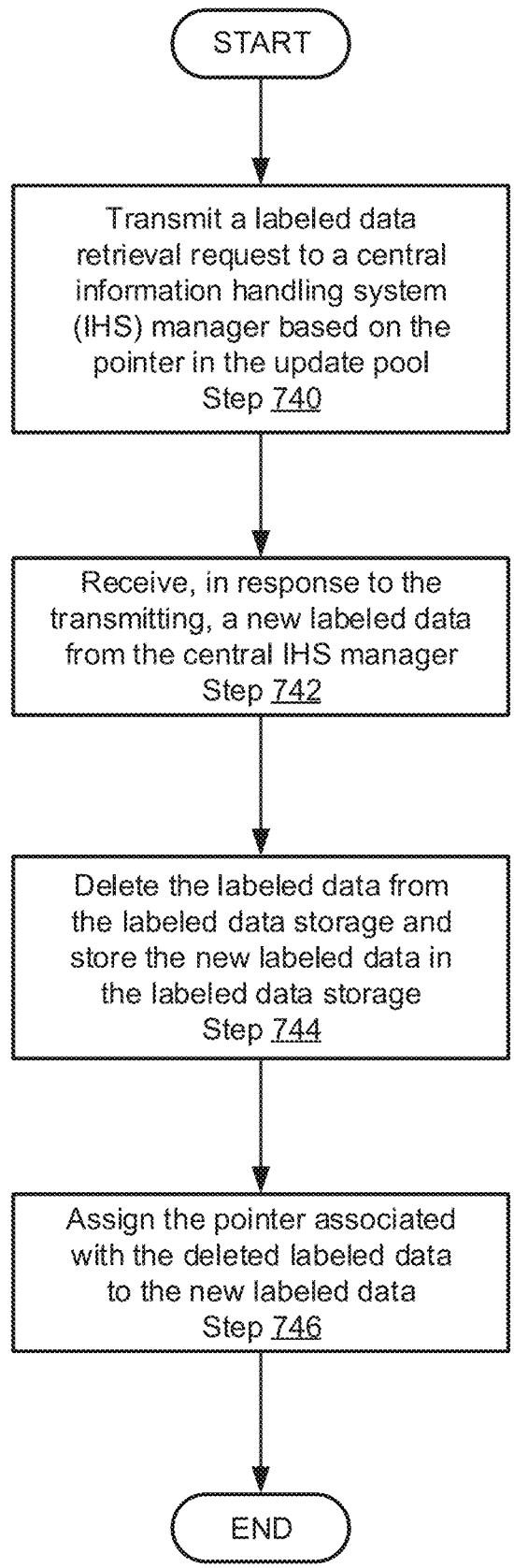
FIG. 7.3

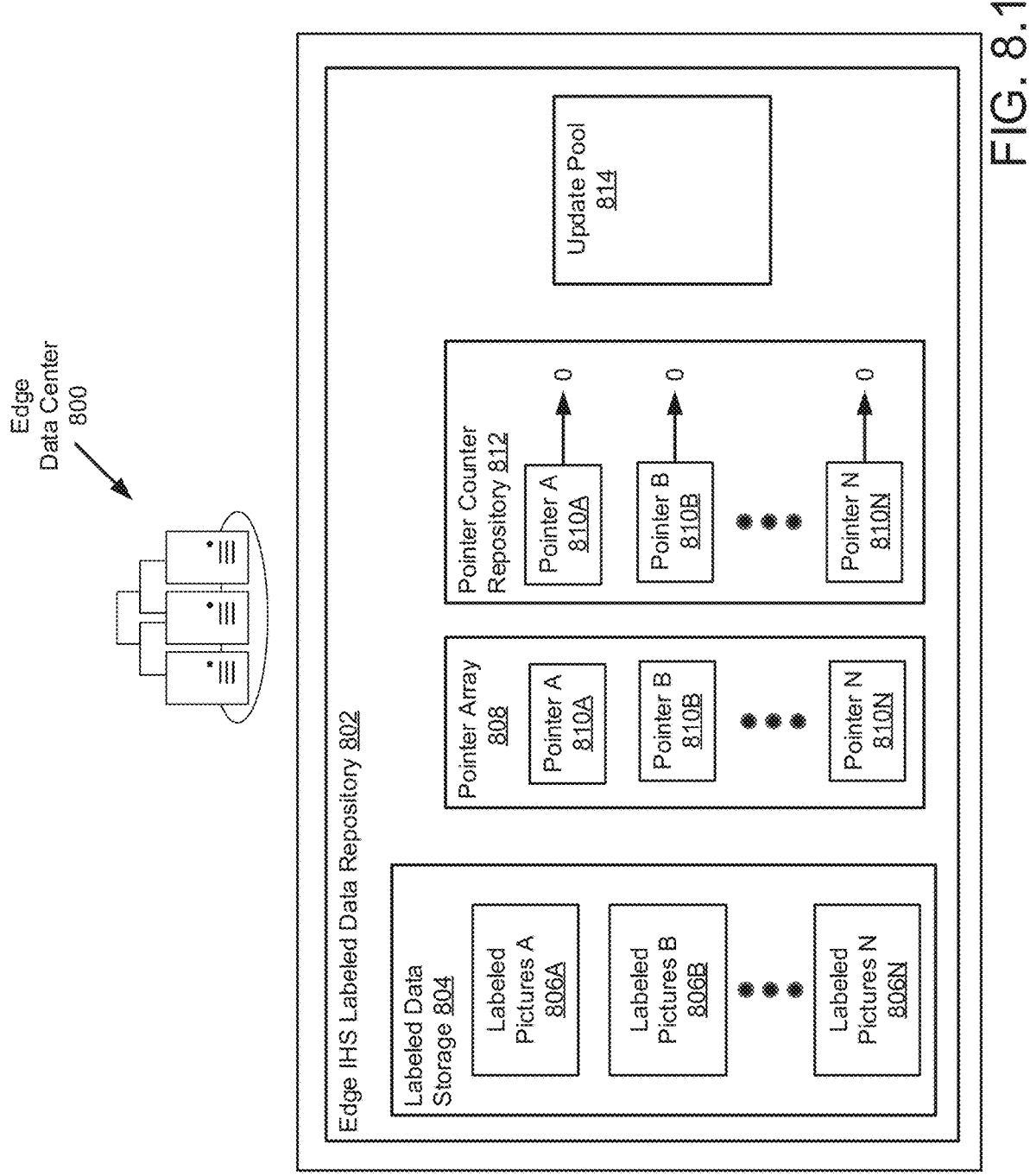
FIG. 8.1

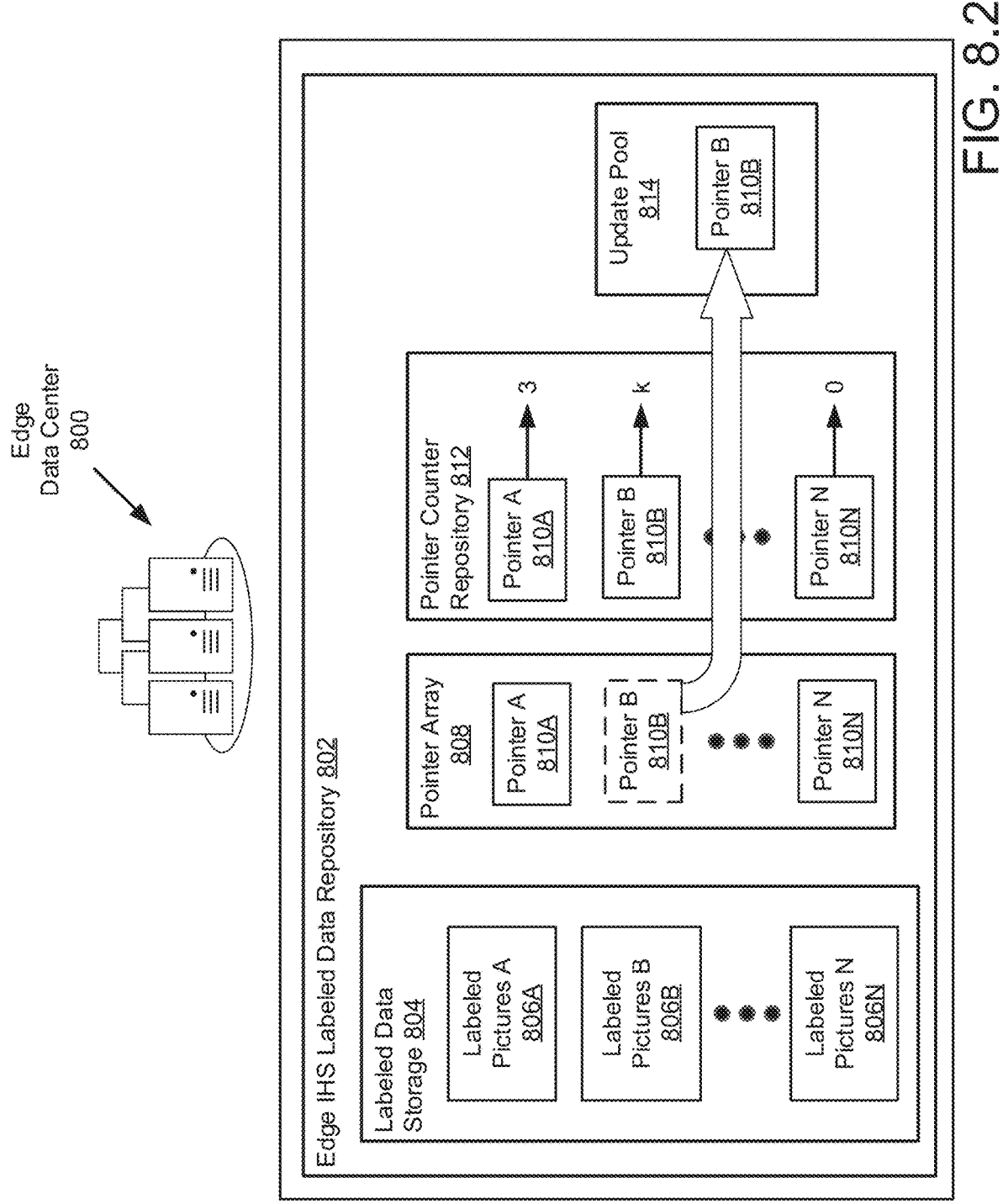
FIG. 8.2

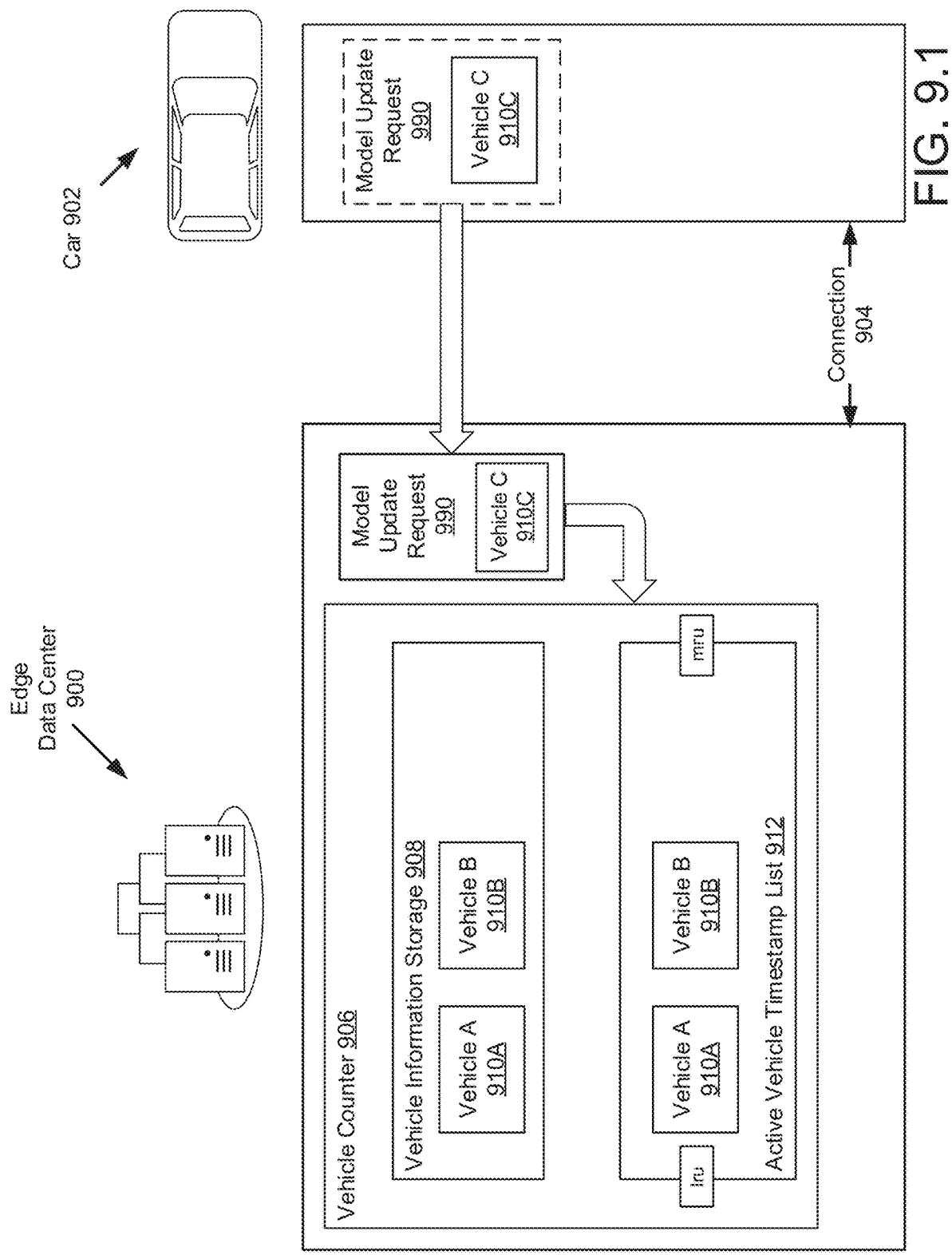
FIG. 9.1

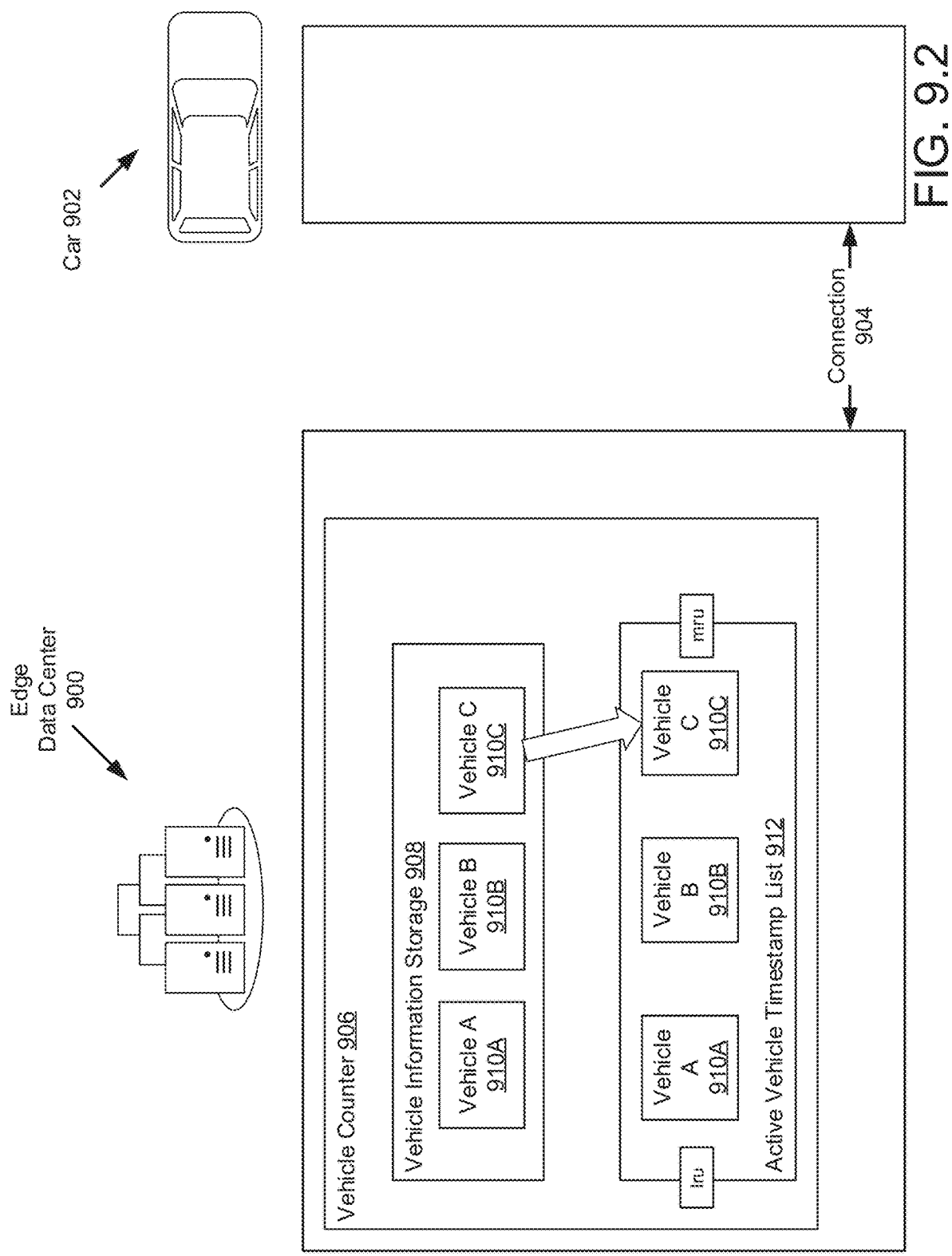
FIG. 9.2

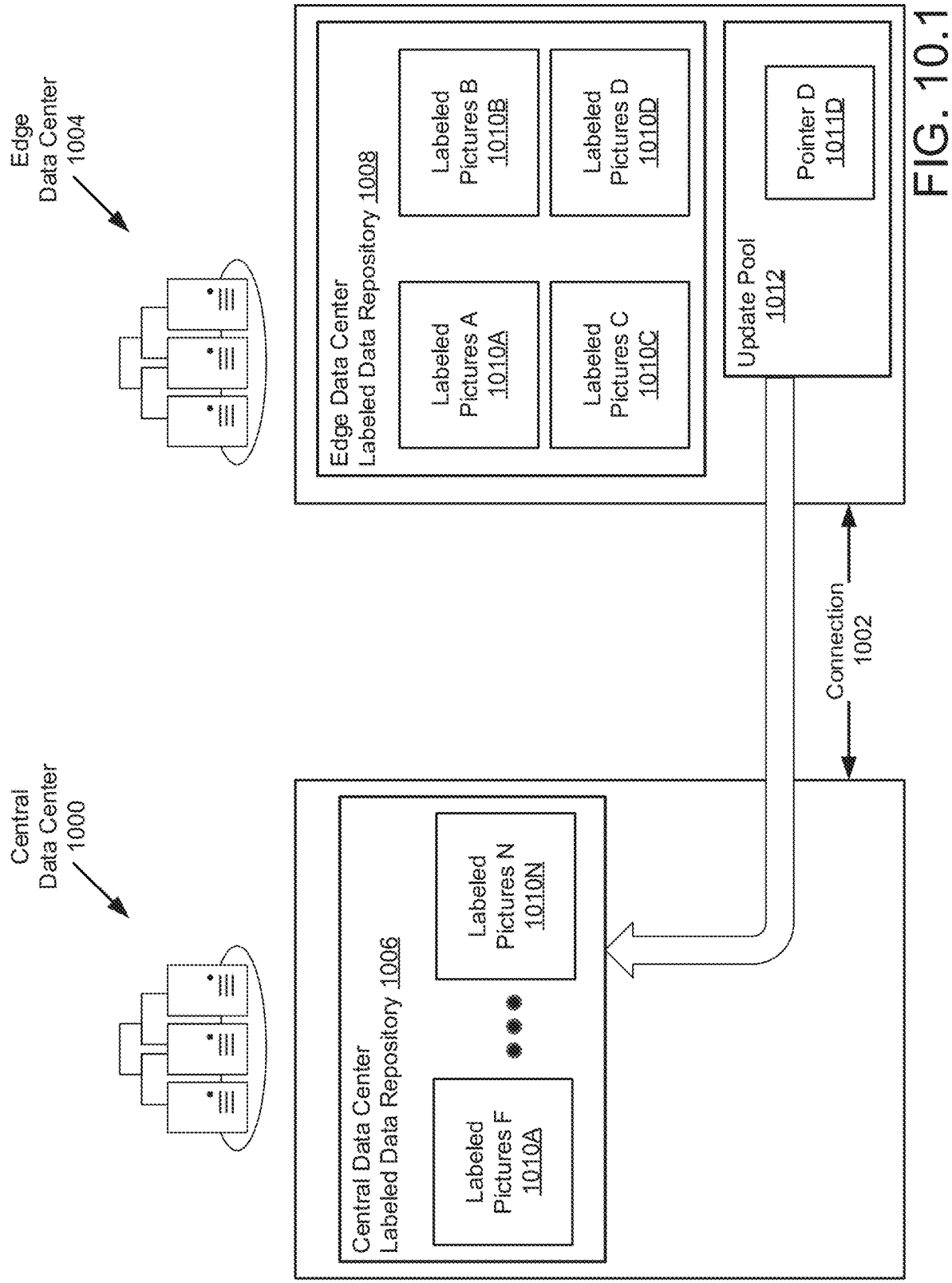
FIG. 10.1

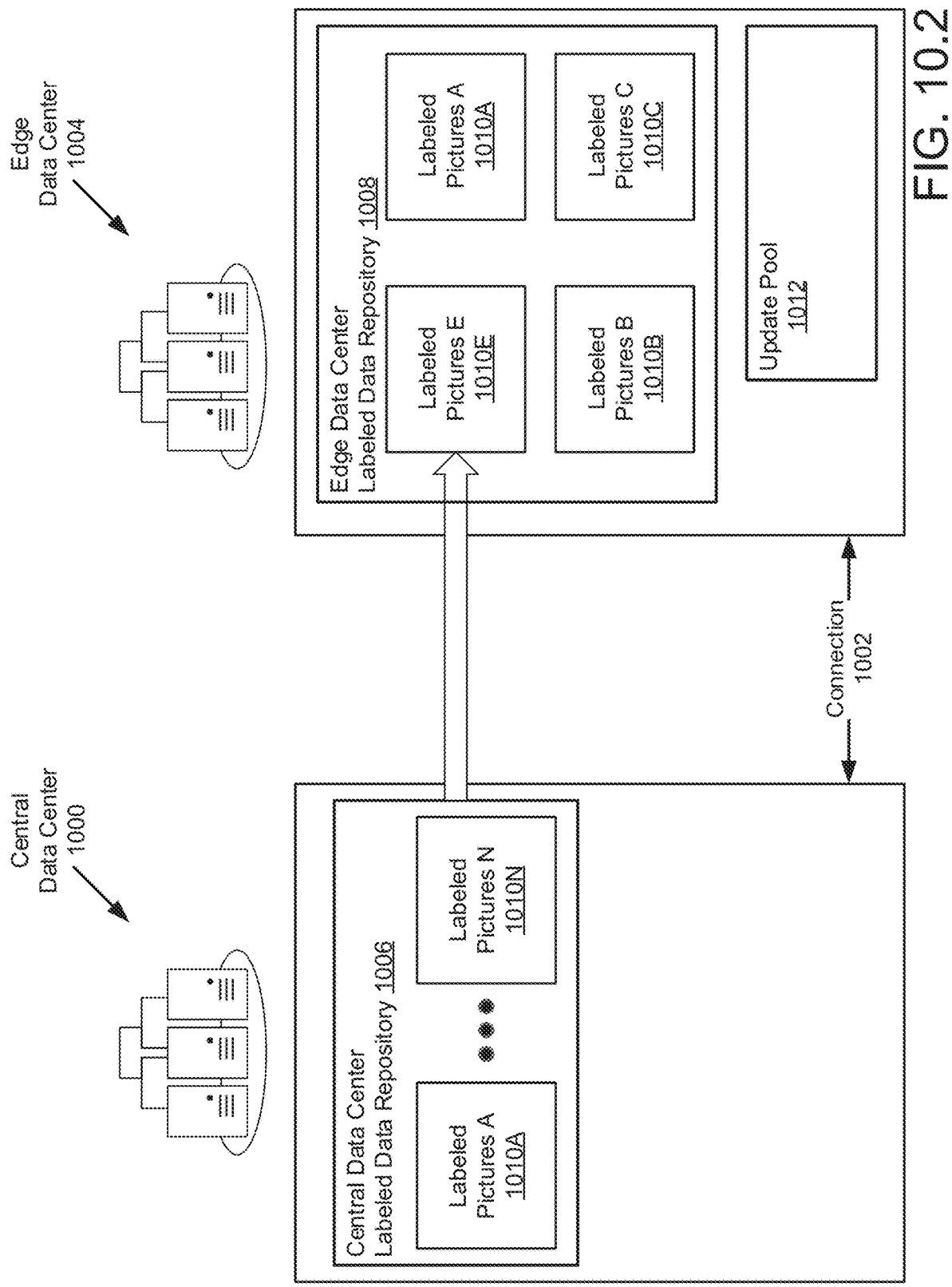
FIG. 10.2

SYSTEM AND METHOD FOR DECENTRALIZED DISTRIBUTED MODEL ADAPTATION

BACKGROUND

Computing devices may provide services. To provide the services, the computing devices may include hardware components and software components. The services provided by the computing devices may be limited by these hardware components.

SUMMARY

In one aspect, an edge information handling system (IHS) in accordance with one or more embodiments of the invention includes: a storage for storing a labeled data associated with a use counter and a vehicle counter; and a processor. The processor is programmed to: update an inference module using the labeled data; determine, after the updating, whether the use counter of the labeled data has exceeded a current use threshold, wherein the current use threshold is based on the vehicle counter; and in response to the use counter of the labeled data exceeding the current use threshold, replacing the labeled data with new labeled data from a central IHS.

In one aspect, a method for updating labeled data stored in an edge information handling system (IHS) manager includes: updating an inference module using a labeled data, wherein the labeled data is stored in a storage of the edge IHS manger; determining, after the updating, whether the use counter of the labeled data has exceeded a current use threshold, wherein the current use threshold is based on a vehicle counter stored in the storage; and in response to the use counter of the labeled data exceeding the current use threshold, replacing the labeled data with new labeled data from a central IHS.

In one aspect, a non-transitory computer readable medium in accordance with one or more embodiments of the invention includes computer readable program code, which when executed by a computer processor enables the computer processor to perform a method for updating labeled data stored in an edge information handling system (IHS) manager. The method includes: updating an inference module using a labeled data, wherein the labeled data is stored in a storage of the edge IHS manger; determining, after the updating, whether the use counter of the labeled data has exceeded a current use threshold, wherein the current use threshold is based on a vehicle counter stored in the storage; and in response to the use counter of the labeled data exceeding the current use threshold, replacing the labeled data with new labeled data from a central IHS.

Other aspects of the embodiments disclosed herein will be apparent from the following description and the appended claims.

BRIEF DESCRIPTION OF DRAWINGS

Certain embodiments of the invention are described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments of the invention.

FIG. 1.2 shows a diagram of a system in accordance with one or more embodiments of the invention.

FIG. 2.1 shows a diagram of an information handling system in accordance with one or more embodiments of the invention.

FIG. 2.2 shows a diagram of a model repository in accordance with one or more embodiments of the invention.

FIG. 3.1 shows a diagram of an information handling system manager in accordance with one or more embodiments of the invention.

FIG. 3.2 shows a diagram of relationships that may be present in the systems of FIGS. 1.1 and 1.2 in accordance with one or more embodiments of the invention.

FIG. 3.3 shows a diagram of an edge information handling system manager in accordance with one or more embodiments of the invention.

FIG. 3.4 shows a diagram of an edge information handling system labeled data repository of the edge information handling system in accordance with one or more embodiments of the invention.

FIG. 4.1 shows a flowchart of a method of providing an inference model in accordance with one or more embodiments of the invention.

FIG. 4.2 shows a flowchart of a method of updating an inference model in accordance with one or more embodiments of the invention.

FIGS. 6.1-6.4 show diagrams illustrating the operation of a system over time in accordance with one or more embodiments of the invention.

FIGS. 7.1-7.3 show flowcharts of processes executed by the edge information handling system in accordance with one or more embodiments of the invention.

FIGS. 8.1-8.2 show diagrams illustrating a data management operation of the edge information handling system in accordance with one or more embodiments of the invention.

FIGS. 9.1-9.2 show diagrams illustrating another data management operation of the edge information handling system in accordance with one or more embodiments of the invention.

FIGS. 10.1-10.2 show diagrams illustrating a data updating operation of the edge information handling system in accordance with one or more embodiments of the invention.

DETAILED DESCRIPTION

Figure 5:
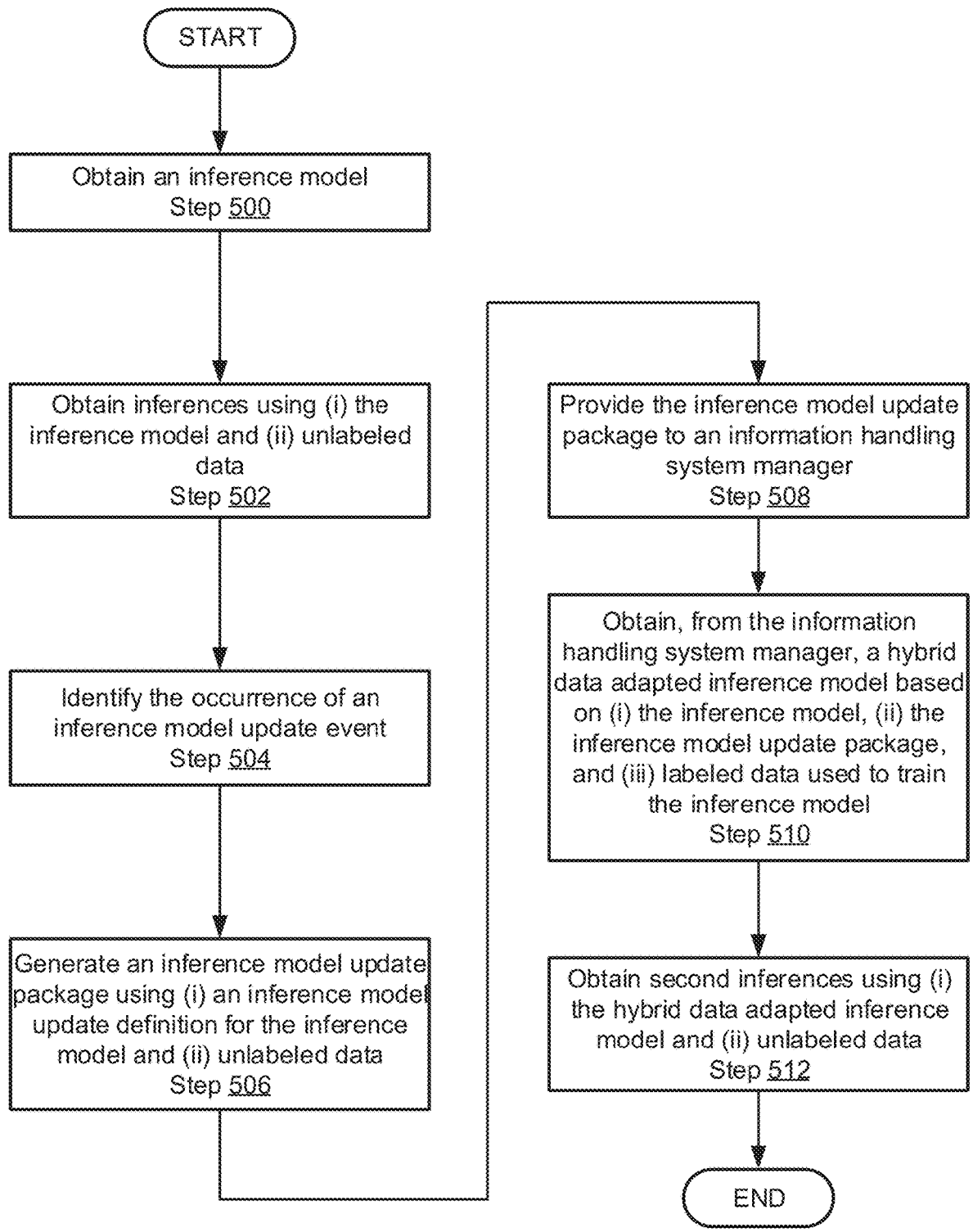
FIG. 5 shows a flowchart of a method of identifying features in unlabeled data in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to systems, devices, and methods for identifying features in unlabeled data. Unlabeled data may include one or more features that are not explicitly identified by metadata or the data structure itself. For example, an image showing a scene in which a person is disposed may include a feature of a person.

In contrast, labeled data may be data for which metadata is available that explicitly identifies one or more features included in the data. For example, an image that is tagged with a name of a person may be labeled data because it explicitly identifies the presence of the person within the image.

To identify features in unlabeled data, an inference model may be used. An inference model may be, for example, a neural network trained to identify the presence of one or more features in data. However, the accuracy of the inferences made by the inference model may be limited by the information on which the inference model is based. For example, an inference model may only be capable of providing accurate inferences if the character of unlabeled data is similar to that upon which the inference model is based.

Embodiments of the invention may provide methods and systems for maintaining the accuracy of inference models as unlabeled data that deviates in character from that of the data upon which the inference model is based is encountered. To do so, a system in accordance with embodiments of the invention may retrain the inference model, in part, based on unlabeled data of a similar character to that upon which inferences will be made. By doing so, the accuracy of the inferences made by a system in accordance with embodiments of the invention may be maintained over time.

Additionally, to enable low computational resources devices such as autonomous vehicles or building management systems to utilize inference models, a system in accordance with embodiments of the invention may primarily utilize other devices to generate the inference models (e.g., due to the heavy computational load involved with generating the inference models).

To do so, the system may divide the process of retraining inference models between tasks that must be carried out using unlabeled data (e.g., that obtained by the low computational resources devices) and other tasks that must be carried out using labeled data (e.g., that maintained by other devices). By doing so, only the results of such computations (rather than the underlying data) may need to be transferred between the devices to retrain an inference model. Consequently, the communications resources necessary to retrain an inference model may be reduced while also maintaining the privacy of unlabeled data collected by the low computational resources devices.

Maintaining the privacy of the unlabeled data may be useful. For example, consider a scenario where an autonomous vehicle is attempting to navigate a city. In doing so, the autonomous vehicle may take images of the area thereby capturing photos that persons in the area may consider to be an invasion of their privacy. While it may not be illegal, the person may not desire to have photos of them be transferred to other devices (e.g., thereby exposing them to some risk that the pictures could be improperly disseminated). A system in accordance with embodiments of the invention may be able to comply with the desires of such persons because, as noted above, the photos of the persons may not need to be transferred beyond the autonomous vehicle for feature identification purposes.

Thus, embodiments of the invention may address a myriad number of problems including limited computing resources at various locations within distributed system and limitations on transmission of data within distributed systems.

Turning to FIG. 1.1, FIG. 1.1 shows a system in accordance with one or more embodiments of the invention. The system may include an information handling system (110). The information handling system may collect information and use the collected information to provide its functionalities. The information collected by the information handling system (110) may be any type and quantity of information.

In one or more embodiments of the invention, the collected information relates to an environment in which the information handling system resides. For example, the information handling system (110) may be a part of a larger device such as, for example, an automobile, an autonomous vehicle, a drone, a building management system, and/or other types of devices.

The collected information may be collected from any number of sources. The sources may include, for example, sensors such as cameras, microphone, radars, and/or other types of devices. The sources may also include, for example, other devices (not shown) operably connected to the information handling system (110) via one or more networks (e.g., 130).

Metadata regarding data structures in which the collected information is stored may also be collected along with the collected information. The metadata may specify, for example, when the data was collected, the entity that collected the collected information, and/or other characteristics of the collected information and/or data structure in which the collected information is stored. However, the collected information may include additional information not expressly identified by the metadata.

For example, consider a scenario where a camera is used to obtain an image of a scene. When collected, the camera may append (or otherwise be associated with) information such as, for example, a creation data, a name, a size, a location, and/or other types of metadata with the data structure in which the image is stored. However, the pixels of the image may also include additional information not explicitly noted by the metadata. For example, if a person is included in the image, a person viewing the image may recognize the person. Similarly, if an image includes a busy roadway, a person may be able to identify road sign, road conditions, and other information not explicitly noted in the metadata. These types of information included in collected data but not explicitly identified by the metadata may be referred to as features included in the collected data.

To provide its services, the information handling system (110) may utilize the features (and/or information regarding the features). For example, if the information handling system (110) is a part of an autonomous vehicle, the information handling system (110) may utilize roadway features identified in the collected information to provide navigation services. In another example, if the information handling system (110) is a part of a building, the information handling system (110) may utilize the motions of persons within the building identified in the collected information to manage the heating and/or cooling of various rooms within the building, turn on/off lighting, and/or automatically manage other pieces of infrastructure within the building.

To utilize the features included in the collected information, the information handling system (110) may analyze the collected information. To do so, the information handling system (110) may use an inference framework such as neural networks to identify the features included in the collected information. The frameworks may include various types of inference models used by the information handling system (110) to make inferences.

An inference model may include, for example, (i) data structures based on known relationships between data and features included in the data (e.g., training data in the context of a neural network) and (ii) instructions for using the data structures to obtain inferences using input data (e.g., collected information).

The inference frameworks utilized by the information handling system (110) may be capable of identifying features within the collected information by training or otherwise adapting the inference frameworks using a labeled data set. A labeled data set may be collected information in which the features are known. For example, a person may review some amount of collected information to identify the features included in the collected information. Once trained, the inference frameworks may be capable of identifying the features included in unlabeled collected information.

However, the inference frameworks may not be perfectly accurate in identifying features within collected information. Due to a limited quantity of labeled data usable for training purposes, the inference frameworks may only accurately identify features in collected data that are similar to those in the limited quantity of labeled data. For example, if the limited quantity of labeled data only includes images from sunny days, inference frameworks trained using this limited quantity of labeled data may only be capable of accurately identifying features within images that are taken on sunny days (and may be inaccurate for images taken on cloudy, rainy, snowy, etc. days).

Due to changing conditions in which the information handling system (110) may reside and the limited quantity of labeled data available to train its inference frameworks, the accuracy of inferences made by an inference framework after it is obtained may change over time, may become inaccurate, or may otherwise become undesirable and reduce the quality of the services provided by the information handling system (110).

In general, embodiments of the invention relate to systems, devices, and methods for identifying features included in collected information. Specifically, embodiments of the invention may provide a method for identifying features that is able to adapt to changes in collected information over time. To do so, the inference frameworks may be periodically retrained based on a combination of labeled data and unlabeled collected data from the information handling system (110). By doing so, the accuracy of features identified using the inference frameworks may be improved.

However, generating and updating inference frameworks may be a computationally expensive task. For example, large numbers of labeled and/or unlabeled data may be utilized and significant processing resources may be required to generate and/or update the frameworks.

In one or more embodiments of the invention, the system of FIG. 1.1 may include an information handling system manager (120). The information handling system manager (120) may assist the information handling system (110) in generating and/or updating inference frameworks. The aforementioned devices may be operably connected via a network (130).

To assist the information handling system (110) in generating and/or updating inference frameworks, the information handling system manager (120) may (i) store the labeled data used to train inference frameworks and (ii) perform a majority of the calculations required to generate and/or update an inference model. For example, when a new inference framework is generated, the information handling system manager (120) may perform all of the calculations using locally accessible (or otherwise not impacting the information handling system (110)) labeled data. The information handling system manager (120) may then provide the generated inference framework to the information handling system (110) for use in identifying features in unlabeled collected information.

Further, when a determination is made that an inference framework should be updated, the information handling system (110) and information handling system manager (120) may perform different portions of the calculations required to update the inference framework. For example, the information handling system (110) may perform only those calculations necessary to be performed using unlabeled collected information and may send the results of those calculations to the information handling system manager (120). In turn, the information handling system manager (120) may use those calculations to update a copy of the inference framework and provide the updated copy of the inference framework to the information handling system (110) for future use.

By doing so, the system of FIG. 1.1 may limit the computational load on the information handling system (110) thereby allowing the information handling system (110) to more efficiently marshal its limited computing resources. Additionally, by having the information handling system (110) perform a portion of the calculations necessary to update an inference framework, copies of the unlabeled collected information may not need to be provided to the information handling system manager (120). By doing so, the quantity of data transferred between the information handling system (110) and the information handling system manager (120) may be reduced. This may be particularly useful in scenarios where an information handling system connection (112) is unreliable, low performance, or for other reasons limits the ability of the information handling system (110) to communicate with other entities.

Additionally, by not needing to send copies of the unlabeled collected information to other entities for inference update purposes, the unlabeled collected information may be less exposed. For example, in some scenarios, the unlabeled collected information may include confidential, private, or other types of information that may not be able to be exposed to other entities (e.g., via contractual relationship, legal right, etc.). Accordingly, the system of FIG. 1.1 may be able to more accurately identify features in collected information while maintaining the privacy of the collected information.

The system of FIG. 1.1 may include any number of information handling systems (110) that provide services to any number of clients (not shown). The clients may be internal to the information handling systems or external (e.g., other devices). The system may also include any number of information handling system managers (120) that provide their functionalities to any number of the information handling systems. Any of the components of FIG. 1.1 may be operably connected to any other component and/or other components not illustrated in FIG. 1.1 via one or more networks (e.g., 130). The networks (e.g., 130) may be implemented using any combination of wired and/or wireless network topologies. The networks may employ any number and types of communication schemes to enable the clients (100) and information handling systems to communicate with each other.

The information handling system (110) and/or information handling system manager (120) may be implemented using computing devices. The computing devices may include, for example, a server, laptop computer, a desktop computer, a node of a distributed system, etc. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the information handling system (110) and/or information handling system manager (120) described in this application and/or all, or a portion, of the methods illustrated in FIGS. 4.1-5. The information handling system (110) and/or information handling system manager (120) may be implemented using other types of computing devices without departing from the invention. For additional details regarding computing devices, refer to FIG. 7. For additional details regarding the information handling system (110), refer to FIGS. 2.1-2.3. For additional details regarding the information handling system manager (120), refer to FIGS. 3.1-3.2.

While the system of FIG. 1.1 has been illustrated and described as including a limited number of specific components, a system in accordance with embodiments of the invention may include additional, fewer, and/or different components without departing from the invention.

Turning to FIG. 1.2, FIG. 1.2 shows a system in accordance with one or more embodiments of the invention. The system may include the IHS network connection (112), the network (130), and multiple ones of the information handling system (110) described above in the system of FIG. 1.1.

Additionally, the system of FIG. 1.2 may include a central IHS manager (122) and multiple ones of an edge IHS manager (124A, 124N). The central IHS manager (122) has the same functionalities and structure as the IHS manager (120) discussed above in FIG. 1.1. The edge IHS managers (124A, 124N) are edge servers placed at the edge of the network (130). Said another way, the central IHS manager (122) is disposed on a cloud network while the edge IHS managers (124A, 124N) are disposed at the edge of the cloud network at physical locations closer to the users of the system.

In one or more embodiments disclosed herein, similar to the central IHS manager (122), the edge IHS managers (124A, 124N) may also have the same functionalities and structure as the IHS manager (120) discussed above in FIG. 1.1. However, in comparison with the central IHS manager (122), the computing devices making up the edge IHS managers (124A, 124N) may have less memory space (i.e., a storage device capable of storing less data). As a result of having less memory space, each edge IHS manager (124A, 124N) may be configured to store only a portion (e.g., a quarter, one half, etc.) of all labeled data stored in the central IHS manager (122).

As further shown in FIG. 1.2, each edge IHS manager (124A, 124N) may be configured to provide functions to users (e.g., information handling systems (110A, 110N)) residing within a specific region (150A, 150N) (e.g., a city, a town, a state, a country, etc.). Said another way, each edge IHS manager (124A, 124N) is configured to serve only users within a predefined area, e.g., users that are within a predetermined physical proximity to each edge IHS manager (124A, 124N). Consequently, the system in FIG. 1.2 creates a decentralized environment where each edge IHS manager (124A, 124N) is in charge of inference framework training for the respective information handling systems (110A, 110N) within its predefined region (150A, 150N). This advantageously reduces network transmission delay in comparison to having the information handling systems (110A, 110N) send inference framework training data directly to the central IHS manager (122).

While the system of FIG. 1.2 has been illustrated and described as including a limited number of specific components, a system in accordance with embodiments of the invention may include additional, fewer, and/or different components without departing from the invention.

Turning to FIG. 2.1, FIG. 2.1 shows a diagram of an information handling system (110) in accordance with one or more embodiments of the invention. As discussed above, the information handling system (110) may provide services to clients.

To provide the services, the information handling system (110) may include data collectors (200), a model manager (202), applications (204), and storage (210). Each of these components is discussed below.

Data collectors (200) may collect information and/or store the collected information in data structures (e.g., 212) in storage (210). The data collectors (200) may obtain the collected information using any method without departing from the invention. The data collectors (200) may be implemented using, for example, sensors or other types of devices for generating the collected information (e.g., regarding an environment in which a device of which the information handling system (110) is a component or operably connected), programs that obtain the collected information from other sources, etc. The information handling system (110) may include any number of type or data collectors that collect any type and quantity of information.

The model manager (202) may provide model management services. The model management services may be used to identify features within the collected data (212). By doing so, the applications (204) and/or other entities may be better able to provide their respective services using the features. The features may be stored in a model inferences repository (220).

For example, consider a scenario where a data collector is implemented as a camera that obtains images of a roadway on which an autonomous vehicle is traversing. The model manager (202) may utilize an inference model from an inference model repository (214) to identify that a stop sign (e.g., a feature) is present in the image. Once identified, the stop sign feature may be added to the model inferences repository (220). An application tasked with navigating the roadway may use the stop sign feature in the model inferences repository (220) to plan a path and/or stop based on the stop sign feature. Consequently, by having access to the stop sign feature, the application may be better able to provide its navigation service.

To provide model management services, the model manager (202) may (i) utilize inference models to identify features in the collected data (212), (ii) assess the accuracy of the inferences made by the inference models, (iii) based on the assessed accuracies, initiate updating of the inference models when the assessed accuracies fall below a threshold level, (iv) perform calculations on the unlabeled collected data in accordance with inference model update definitions to obtain an update package usable to partially update an inference model, (v) provide the update package to an information handling system manager, (vi) obtain an updated inference model based, in part, on the update package from the information handling system manager, and (vii) use the updated inference model to identify features in collected information. By doing so, the services provided by the information handling system (110) may be improved by improving the rate of accurate identification of features within collected data while limiting the added computational load on the information handling system (110) when doing so.

When providing its functionality, the model manager (202) may perform all, or a portion, of the methods illustrated in FIGS. 4.1-5.

The applications (204) may provide computer implemented services. The applications (204) may be similar to or different from applications hosted by clients that provide similar or different computer implemented services. When providing their services, the applications (204) may use features in the model inference repository (220). Consequently, the accuracy of feature identification may impact the quality of services provided by the applications (204). The applications (204) may provide any type and quantity of computer implemented services without departing from the invention.

In one or more embodiments of the invention, the data collectors (200), model manager (202), and/or the applications (204) are implemented using a hardware device including circuitry. The hardware device may be, for example, a digital signal processor, a field programmable gate array, or an application specific integrated circuit. The circuitry may be adapted to cause the hardware device to perform the functionality of the data collectors (200), model manager (202), and/or the applications (204). The data collectors (200) model manager (202), and/or the applications (204) may be implemented using other types of hardware devices without departing from the invention.

In one or more embodiments of the invention, the data collectors (200), model manager (202), and/or the applications (204) are implemented using a processor adapted to execute computing code stored on a persistent storage that when executed by the processor performs the functionality of the data collectors (200), model manager (202), and/or the applications (204). The processor may be a hardware processor including circuitry such as, for example, a central processing unit or a microcontroller. The processor may be other types of hardware devices for processing digital information without departing from the invention.

As used herein, an entity that is programmed to perform a function (e.g., step, action, etc.) refers to one or more hardware devices (e.g., processors, digital signal processors, field programmable gate arrays, application specific integrated circuits, etc.) that provide the function. The hardware devices may be programmed to do so by, for example, being able to execute computer instructions (e.g., computer code) that cause the hardware devices to provide the function. In another example, the hardware device may be programmed to do so by having circuitry that has been adapted (e.g., modified) to perform the function. An entity that is programmed to perform a function does not include computer instructions in isolation from any hardware devices. Computer instructions may be used to program a hardware device that, when programmed, provides the function.

In one or more embodiments disclosed herein, the storage (210) is implemented using physical devices that provide data storage services (e.g., storing data and providing copies of previously stored data). The devices that provide data storage services may include hardware devices and/or logical devices. For example, storage (210) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage (210) may include a memory device (e.g., a dual in line memory device) in which data is stored and from which copies of previously stored data are provided. In another example, storage (210) may include a persistent storage device (e.g., a solid-state disk drive) in which data is stored and from which copies of previously stored data are provided. In a still further example, storage (210) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (210) may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage (210) may store data structures including, for example, collected data (212), an inference model repository (214), an inference model update definition repository (216), an inference model update package repository (218), and/or a model inference repository (220). Each of these data structures is discussed below.

The collected data (212) may be implemented using one or more data structures that includes information in which features may be present. For example, the collected data (212) may include images, audio files, video files, unstructured data, databases, etc.

The collected data (212) may be maintained by, for example, the data collectors (200). For example, the data collectors (200) may add, remove, and/or modify information included in the collected data (212).

The data structures of the collected data (212) may be implemented using, for example, lists, tables, unstructured data, databases, etc. While illustrated in FIG. 2.1 as being stored locally, the collected data (212) may be stored remotely and may be distributed across any number of devices without departing from the invention.

The inference model repository (214) may be implemented using one or more data structures that includes inference models and/or information regarding inference models. The inference model repository (214) may include any number and type of inference models. For example, the inference model repository may include labeled data adapted inference models (e.g., inference models based only on labeled data), hybrid data adapted inference models (e.g., inference models based on labeled data and unlabeled data), and/or other types of models. The inference model repository (214) may also include, for example, which inference models may be usable to identify features on various portions of the collected data (212).

The inference model repository (214) may be maintained by, for example, the model manager (202). For example, the model manager (202) may add, remove, and/or modify information included in the inference model repository (214).

The data structures of the inference model repository (214) may be implemented using, for example, lists, tables, unstructured data, databases, etc. While illustrated in FIG. 2.1 as being stored locally, the inference model repository (214) may be stored remotely and may be distributed across any number of devices without departing from the invention. For additional details regarding the inference model repository (214), refer to FIG. 2.2.

The inference model update definition repository (216) may be implemented using one or more data structures that include information regarding actions needed to be performed by the information handling system (110) to update an inference model. For example, the inference model update definition repository (216) may specify, for an example inference model, the calculations that need to be performed over a portion of the collected data (e.g., unlabeled data) to obtain all, or a portion, of an update package.

The inference model update definition repository (216) may be maintained by, for example, the model manager (202). For example, the model manager (202) may add, remove, and/or modify information included in the inference model repository (214).

The data structures of the inference model update definition repository (216) may be implemented using, for example, lists, tables, unstructured data, databases, etc. While illustrated in FIG. 2.1 as being stored locally, the inference model update definition repository (216) may be stored remotely and may be distributed across any number of devices without departing from the invention.

The inference model update package repository (218) may be implemented using one or more data structures that include update packages obtained using inference model update definitions and/or information regarding the update packages.

The inference model update package repository (218) may be maintained by, for example, the model manager (202). For example, the model manager (202) may add, remove, and/or modify information included in the inference model repository (214).

The data structures of the inference model update package repository (218) may be implemented using, for example, lists, tables, unstructured data, databases, etc. While illustrated in FIG. 2.1 as being stored locally, the inference model update package repository (218) may be stored remotely and may be distributed across any number of devices without departing from the invention.

The model inference repository (220) may be implemented using one or more data structures that include any number of features identified using inference models. The repository may include any number and type of features. The model inference repository (220) may also include information regarding the features including, for example, accuracy scores, identifiers of the inference models used to extract the features, etc.

The model inference repository (220) may be maintained by, for example, the model manager (202). For example, the model manager (202) may add, remove, and/or modify information included in the inference model repository (214).

The data structures of the model inference repository (220) may be implemented using, for example, lists, tables, unstructured data, databases, etc. While illustrated in FIG. 2.1 as being stored locally, the model inference repository (220) may be stored remotely and may be distributed across any number of devices without departing from the invention.

While the storage (210) has been illustrated and described as including a limited quantity and type of data, a storage in accordance with embodiments of the invention may store additional, less, and/or different data without departing from the invention.

While the information handling system (110) has been illustrated and described as including a limited number of specific components, an information handling system in accordance with embodiments of the invention may include additional, fewer, and/or different components without departing from the invention.

Turning to FIG. 2.2, FIG. 2.2 shows a diagram of an inference model repository (214) in accordance with one or more embodiments of the invention. The inference model repository (214) may store any number and type of inference models and/or information regarding the models (e.g., how to use the models, for which data the inference models should be used, information regarding how to determine whether the inference models are accurately identifying features included in data, etc.).

The inference model repository (214) may include labeled data adapted inference models (230). Labeled data adapted inference models (230) may be inference models trained using only labeled data. When an inference model is initially created, it may be created using only labeled data. For example, if an inference model is a neural network based inference model, the neural network may be trained using the labeled data.

In one or more embodiments of the invention, at least one of the labeled data adapted inference models (230) is a neural network based inference model. To generate such an inference model, a training algorithms that may be supported by optimization (e.g., optimizing an objective function using the labels as the goal and the data as the domain) may be used. The neural network may be, for example, a deep neural network that utilizes a backpropagation algorithm and an optimization algorithm (e.g., Stochastic Gradient Descent (SGD) to train the deep neural network.

Prior to training, one network topology of neurons and interconnecting weights may be chosen. Any such topologies and interconnecting weights may be used without departing from the invention. After the topology is established, the weight values may be set to random or predefined values. After the topology and weights are set, then the training algorithm may be used to separate batches of data and flow the data through the network. After flowing the data through the network, a backpropagation may be performed, which may set the direction of movement of each of the weights through one or more gradients (e.g., optimizing the objective function). Consequently, the weights are adjusted by a small amount in accordance with the optimization. The aforementioned process may be repeated for different portions of the labeled data until all, or a predetermined portion, of the labeled data is utilized for training purposes (this process referred to as a training cycle). Training cycles may be repeated until a predetermined number of training cycles have been completed or until one or more criteria are met (e.g., no significant changes in inference accuracy, weight change, topology adjustment, etc. from previous training cycles).

In one or more embodiments of the invention, at least one of the labeled data adapted inference models (230) is based on a domain adversarial neural network. A domain adversarial neural network may be a neural network that may be (i) initially trained using labeled data and (ii) updated using the labeled data, the unlabeled data, and the previously trained neural network.

The domain adversarial neural network may include (i) a pattern identifier (that is able to learn how to identify patterns that are discriminative and invariant between a source domain such as the labeled data and a target domain such as unlabeled data), (ii) a label predictor usable to identify a label (e.g., a feature within unlabeled data) corresponding to identified patterns, and/or (iii) a domain classifier usable to identify whether ingested data (e.g., unlabeled data being processed by the neural network) is from the source domain or the target domain. The label predictor may be trained exclusively using the labeled data while the domain classifier may be trained using labeled data and/or unlabeled data. Thus, when low accuracy identifications are being made by a trained inference model, the inference model may be retrained using additional unlabeled data.

By doing so, the inference model may be updated to better identify patterns and corresponding features included in unlabeled data by utilizing unlabeled data more closely resembling that being collected.

To train and/or retrain a domain adversarial neural network, an optimization function that optimizes the performance of the pattern identifier, label predictor, and domain classifier may be utilized. The optimization process may include (i) performing forward propagation, backpropagation, and gradient initialization with respect to the source domain (e.g., a first set of calculations using only the labeled data and providing a labeled data output), (ii) performing forward propagation, backpropagation, and gradient increment with respect to the target domain (e.g., a second set of calculations using only the unlabeled data and providing an unlabeled data output), and (iii) establishing and/or updating the weights and topology based on the objective function (which uses the labeled data output and unlabeled data output).

As are discussed with greater detail with respect to FIGS. 3.1 and 3.2, the information handling system manager may manage the processes of obtaining and/or updating inference models. When doing so, the information handling system manager may have the information handling system perform some of the calculations (e.g., those with respect to the target domain to obtain the unlabeled data output) and may perform the other calculations required to obtain and/or update an inference model. Once obtained, the new/updated inference model may be provided (and/or along with information regarding the inference model) to the information handling system which may store the inference model in the inference model repository (214).

Inference models that are based (e.g., have been trained and/or updated using) on both labeled and unlabeled may be referred to as hybrid data adapted inference models. The inference model repository (214) may include any number of hybrid data adapted inference models (232).

While the inference model repository (214) has been illustrated as including a limited number and type of data structures, the inference model repository (214) may include additional, different, and/or fewer data structures than those illustrated in FIG. 2.2 without departing from the invention.

Turning to FIG. 3.1, FIG. 3.1 shows a diagram of an information handling system manager (120) in accordance with one or more embodiments of the invention. As discussed above, the information handling system manager (120) may orchestrate the generation and distribution of inference models to any number of information handling systems. As also discussed above, the central IHS manager (122) shown in FIG. 1.2 may also have the same structure and functionalities as the information handling system manager (120).

To do so, the information handling system manager (120) may include an inference framework manager (302) and storage (310). Each of these components is discussed below.

The inference framework manager (302) may provide inference framework services. The inference framework services may be used to ensure that information handling systems are able to accurately identify features included in unlabeled data. By doing so, the information handling systems may be better able to provide their respective services using the features.

To provide inference framework services, the inference framework manager (302) may (i) obtain and distribute labeled data adapted inference models and corresponding inference model update definitions and (ii) obtain and distribute hybrid data adapted inference models and corresponding inference model update definitions.

To obtain the labeled data adapted inference models, the inference framework manager (302) may train neural networks using labeled data stored in the labeled data repository (312). The neural networks may be trained as discussed with respect to FIG. 2.2. The labeled data adapted inference models may be stored in a labeled data adapted inference model repository (314).

To obtain the hybrid data adapted inference models, the inference framework manager (302) may train neural networks using the labeled data stored in the labeled data repository (312) and update packages stored in the update package repository (318). An update package may include the result of calculations performed by an information handling system based on an inference model update definition. An inference model update definition may specify the calculations to be performed by an information handling system to update an inference model. For example, as described with respect to FIG. 3.2, a neural network may be updated to better process unlabeled data by performing a first set of calculations with respect to labeled data, a second set of calculations with respect to unlabeled data, and a third set of calculations with respect to the result of the other calculations. Consequently, the calculations necessary to be performed to update a neural network may be distributed to the respective devices that host the data on which different portions of the calculations are performed. By doing so, the various portions of the labeled and/or unlabeled data may not need to be transferred between devices to update a neural network. Rather, merely the results of the calculations which may be vastly smaller (e.g., less than 0.1% the size of the data on which the calculations are performed) in size than the data on which the calculations are performed may need to be transferred to a single device to update the neural network (e.g., thereby adapting it to both labeled and/or unlabeled data for feature identification purposes).

When providing its functionality, the inference framework manager (302) may perform all, or a portion, of the methods illustrated in FIGS. 4.1-5.

In one or more embodiments of the invention, the inference framework manager (302) is implemented using a hardware device including circuitry. The hardware device may be, for example, a digital signal processor, a field programmable gate array, or an application specific integrated circuit. The circuitry may be adapted to cause the hardware device to perform the functionality of the inference framework manager (302). The inference framework manager (302) may be implemented using other types of hardware devices without departing from the invention.

In one or more embodiments of the invention, the inference framework manager (302) is implemented using a processor adapted to execute computing code stored on a persistent storage that when executed by the processor performs the functionality of the inference framework manager (302). The processor may be a hardware processor including circuitry such as, for example, a central processing unit or a microcontroller. The processor may be other types of hardware devices for processing digital information without departing from the invention.

As used herein, an entity that is programmed to perform a function (e.g., step, action, etc.) refers to one or more hardware devices (e.g., processors, digital signal processors, field programmable gate arrays, application specific integrated circuits, etc.) that provide the function. The hardware devices may be programmed to do so by, for example, being able to execute computer instructions (e.g., computer code) that cause the hardware devices to provide the function. In another example, the hardware device may be programmed to do so by having circuitry that has been adapted (e.g., modified) to perform the function. An entity that is programmed to perform a function does not include computer instructions in isolation from any hardware devices. Computer instructions may be used to program a hardware device that, when programmed, provides the function.

In one or more embodiments disclosed herein, the storage (310) is implemented using physical devices that provide data storage services (e.g., storing data and providing copies of previously stored data). The devices that provide data storage services may include hardware devices and/or logical devices. For example, storage (310) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage (310) may include a memory device (e.g., a dual in line memory device) in which data is stored and from which copies of previously stored data are provided. In another example, storage (310) may include a persistent storage device (e.g., a solid-state disk drive) in which data is stored and from which copies of previously stored data is provided. In a still further example, storage (310) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (310) may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage (310) may store data structures including, for example, a labeled data repository (312), a labeled data adapted inference model repository (314), an inference model update definitions repository (316), an update package repository (318), and/or a hybrid data adapted inference model repository (320). Each of these data structures is discussed below.

The labeled data repository (312) may be implemented using one or more data structures that include any quantity and type of labeled data.

The labeled data adapted inference model repository (314) may be implemented using one or more data structures that include any number and type of labeled data adapted inference models and/or information regarding the inference models (e.g., applicability, deployment location, how to utilize the models, etc.).

The inference model update definitions repository (316) may be implemented using one or more data structures that include any number of inference model update definitions. An inference model update definition may include any type and quantity of information regarding the calculations to be performed to update an inference model. Information from an inference model update definition may be provided to an information handling system so that it is able to perform a portion of the calculations necessary to update an inference model (e.g., the calculations with respect to unlabeled data). Once calculated, the information handling system may provide an update package that includes the result of the calculations and/or other information to the information handling system manager (120) that enables the information handling system manager to update an inference model thereby adapting it to identify features included in unlabeled data and labeled data upon which the update is based.

The inference model update package repository (318) may be implemented using one or more data structures that include any number and type of update packages obtained from information handling systems. The update packages may include (i) the results of calculations performed with respect to unlabeled data necessary to update an inference model, (ii) a copy of or identifier of an inference model partially updatable using the results of the calculations, and/or (iii) other information usable to update the inference model.

The hybrid data adapted inference model repository (320) may be implemented using one or more data structures that include any number and type of hybrid data adapted inference models and/or information regarding the inference models (e.g., applicability, deployment location, how to utilize the models, etc.). Such models may be based on both labeled data and unlabeled data. The models may be obtained using labeled data hosted by the information handling system (and/or other entities) and update packages obtained from information handling systems.

The labeled data repository (312), labeled data adapted inference model repository (314), inference model update definitions repository (316), update package repository (318), and/or hybrid data adapted inference model repository (320) may be maintained by, for example, the inference framework manager (302). For example, the inference framework manager (302) may add, remove, and/or modify information included in the labeled data repository (312), labeled data adapted inference model repository (314), inference model update definitions repository (316), update package repository (318), and/or hybrid data adapted inference model repository (320).

The data structures of the labeled data repository (312), labeled data adapted inference model repository (314), inference model update definitions repository (316), update package repository (318), and/or hybrid data adapted inference model repository (320) may be implemented using, for example, lists, tables, unstructured data, databases, etc. While illustrated in FIG. 3.1 as being stored locally, all or a portion of the labeled data repository (312), labeled data adapted inference model repository (314), inference model update definitions repository (316), update package repository (318), and/or hybrid data adapted inference model repository (320) may be stored remotely and/or may be distributed across any number of devices without departing from the invention.

While the storage (310) has been illustrated and described as including a limited quantity and type of data, a storage in accordance with embodiments of the invention may store additional, less, and/or different data without departing from the invention.

While the information handling system manager (120) has been illustrated and described as including a limited number of specific components, an information handling system in accordance with embodiments of the invention may include additional, fewer, and/or different components without departing from the invention.

To further clarify aspects of embodiments of the invention, relationships that may exist within the systems of FIGS. 1.1 and 1.2 are illustrated in FIG. 3.2. FIG. 3.2 shows a diagram of relationships in accordance with one or more embodiments of the invention. The relationships may include (i) a first association between an inference model (e.g., 350) and a calculation (e.g., 352) and (ii) a second association between an update definition (e.g., 360) and calculations (e.g., 352, 354, 356) used to update an inference model.

Turning to the first association, to obtain a labeled data adapted inference model (350), a set of calculations may need to be performed. As illustrated in FIG. 3.2, these calculations may only include labeled data calculations (352). Consequently, a labeled data adapted inference model (350) may be obtained by only performing calculations using labeled data.

Turning to the second association, when an inference model is updated, a set of calculations may need to be performed. In the system of FIG. 1, these calculations may be performed by different devices thereby distributing the workload across the system and reducing the amount of data transferred between devices (when compared to scenarios in which a single device performs all of the calculations using data from multiple devices).

The inference model update definition (360) may specify the calculations necessary to be performed by each device within the system of FIG. 1. These calculations may include labeled data calculations (352) (e.g., a set of calculations performed using only labeled data to obtain a first result), unlabeled data calculations (354) (e.g., a second set of calculations performed using only unlabeled data to obtain a second result), and update calculations using the unlabeled data calculations result and the labeled data calculations result (356). Any of the calculations (e.g., 352, 354, 356) may be specified as, for example, lists of actions to be performed to obtain the calculation results and/or distribution of the calculation results (such as generating an update package and providing it to an information handling system manager).

Copies of the inference model update definition (360) and/or information based on the inference model update definition (360) may be distributed to the devices of FIGS. 1.1 and 1.2 to orchestrate distributed performance of the calculations and distribution of the results to update an inference model.

FIG. 3.3 shows a diagram of an edge IHS manager (124) in accordance with one or more embodiments of the invention. As discussed above, similar to the information handling system manager (120) and central IHS manager (122), the edge IHS manager (124) may orchestrate the generation and distribution of inference models to any number of information handling systems.

As shown in FIG. 3.3, the edge IHS manager (124) also includes an inference framework manager (302), storage (310), a labeled data adapted inference model repository (314), the inference model update definitions repository (316), an update package repository (318), and a hybrid data adapted inference model repository (320) of the information handling system manager (120) shown in FIG. 3.1. Each of these components has the same functionalities as the corresponding components discussed above in FIG. 3.1.

In one or more embodiments disclosed herein, the edge IHS manager (124) further includes a labeled data storage manager (304) and an edge IHS labeled data repository (322). The edge IHS labeled data repository (322) is described in more detail below in FIG. 3.4.

The labeled data storage manager (304) may provide labeled data storage services. The labeled data storage services may be used to ensure that all labeled data stored in the edge IHS labeled data repository (322) (i.e., stored labeled data) are up-to-date. The labeled data storage services may also be used to ensure that none of the stored labeled data are used more than a predetermined number of times to train inference models received from one or more information handling systems (e.g., 110, FIGS. 1.1 and 1.2).

To provide labeled data storage services, the labeled data storage manager (304) may assign each stored labeled data with a unique pointer. Each unique pointer will also be associated with a pointer counter that is incremented by the labeled data storage manager (304) each time a stored labeled data is used to train an inference model.

The labeled data storage manager (304) may also calculate a use threshold for the stored labeled data based on the number of information handling systems in communication with the edge IHS labeled data repository (322). Using this use threshold and the pointer counter, the labeled data storage manager (304) may determine if any labeled data needs to be replaced with new labeled data from the central IHS manager (122), and communicate with the central IHS manager (122) to retrieve the new labeled data. These functionalities of the labeled data storage manager (304) are discussed in more detail below in FIGS. 7.1-10.2. When providing its functionality, the labeled data storage manager (304) may perform all, or a portion, of the methods illustrated in FIGS. 7.1-7.3.

In one or more embodiments of the invention, the labeled data storage manager (304) is implemented using a hardware device including circuitry. The hardware device may be, for example, a digital signal processor, a field programmable gate array, or an application specific integrated circuit. The circuitry may be adapted to cause the hardware device to perform the functionality of the labeled data storage manager (304). The labeled data storage manager (304) may be implemented using other types of hardware devices without departing from the invention.

FIG. 3.4 shows an example of an edge IHS labeled data repository (322) in accordance with one or more embodiments. As shown in FIG. 3.4, the edge IHS labeled data repository (322) may store a labeled data storage (399), a pointer counter repository (395), a pointer array (397), an update pool (393), and a vehicle counter (391) including a vehicle information storage (389) and an active vehicle timestamp list (387). Each of these components of the edge IHS labeled data repository (322) may be implemented separately (or in any combination) using, for example, lists, tables, unstructured data, databases, etc. For example, the labeled data storage (399) may be a database storing batches of the labeled data.

Additionally, in one or more embodiments disclosed herein, the vehicle information storage (389) and active vehicle timestamp list (387) may be a double-linked list that tracks a set of active information handling systems (110) (e.g., vehicles) in communication with and requesting inference model training with the edge IHS manager (124). Although the vehicle counter (391) and its respective components have been described specifically with regard to vehicles, one of ordinary skill in the art would appreciate that the vehicle counter (391) can be used to track any device and/or system (e.g., personal computers, airplanes, etc.) including the information handling system (110).

The labeled data storage (399), pointer counter repository (395), pointer array (397), and update pool (393) are discussed in more detail below in FIGS. 8.1-8.2. The vehicle information storage (389) and active vehicle timestamp list (387) are discussed in more detail below in FIGS. 9.1-9.2.

As discussed above, the systems of FIGS. 1.1 and 1.2 may identify features in unlabeled data to provide computer implemented services to other entities. FIGS. 4.1-5 and 7.1-7.3 illustrate methods that may be performed by components of the systems of FIGS. 1.1 and 1.2 to provide computer implemented services.

FIG. 4.1 shows a flowchart of a method in accordance with one or more embodiments of the invention. The method depicted in FIG. 4.1 may be performed to provide labeled data adapted inference models to information handling systems in accordance with one or more embodiments of the invention. The method shown in FIG. 4.1 may be performed by, for example, an information handling system manager (e.g., 120, FIGS. 1.1; 122 and 124, FIG. 1.2). Other components of the systems in FIGS. 1.1 and 1.2 may perform all, or a portion, of the method of FIG. 4.1 without departing from the invention.

While FIG. 4.1 is illustrated as a series of steps, any of the steps may be omitted, performed in a different order, additional steps may be included, and/or any or all of the steps may be performed in a parallel and/or partially overlapping manner without departing from the invention.

In step 400, labeled data is obtained. The labeled data may be obtained from any source and include any type and quantity of labeled data. The labeled data may include similar data to that which an information handling system may need to perform feature identification.

The labeled data may be obtained from a repository, another device, or another source without departing from the invention.

In step 402, a labeled data adapted inference model is generated using the labeled data. The labeled data adapted inference model may be generated by training or otherwise modifying an inference model to identify features within the labeled data. The inference model may be trained or otherwise modified using all or a portion of the inference data.

In one or more embodiments of the invention, the inference model is a neural network and the labeled data is used to train the inference mode. The labeled data may include, for example, data obtained by an information handling system that will use the labeled data adapted inference model or may obtain similar data to that of the labeled data (e.g., similar in character such as, for example, similar types of images).

In step 404, a model update definition for the labeled data adapted inference model is generated. As discussed above, the model update definition may be a data structure that includes information regarding the actions that need to be performed to update an inference model. The model update definition may specify (i) actions to be performed with respect to the labeled data and (ii) actions to be performed with respect to unlabeled data. The model update definition may specify that an information handling system using the labeled data adapted inference model may perform a portion of the actions, the unlabeled data need not be provided to the information handling system manager, that only a result of the actions may need to be provided to the information handling system manager in the form of an update package, and one or more thresholds or other factors for identifying whether the labeled data adapted inference model is accurately identifying features in unlabeled data.

In step 406, the labeled data adapted inference model and inference model update definition are provided to an information handling system. The model and definition may be provided to the information handling system via network communications or other means.

The method may end following step 406.

Using the method illustrated in FIG. 4.1, an information handling system may be able to identify features in unlabeled data using the labeled data adapted inference model, identify whether the labeled data adapted inference model is accurately identifying features, and perform actions appropriate to update the inference model to more accurately identify features.

FIG. 4.2 shows a flowchart of a method in accordance with one or more embodiments of the invention. The method depicted in FIG. 4.2 may be performed to provide labeled data adapted inference models to information handling systems in accordance with one or more embodiments of the invention. The method shown in FIG. 4.2 may be performed by, for example, an information handling system manager (e.g., 120, FIGS. 1.1; 122 and 124, FIG. 1.2). Other components of the systems in FIGS. 1.1 and 1.2 may perform all, or a portion, of the method of FIG. 4.2 without departing from the invention.

While FIG. 4.2 is illustrated as a series of steps, any of the steps may be omitted, performed in a different order, additional steps may be included, and/or any or all of the steps may be performed in a parallel and/or partially overlapping manner without departing from the invention.

In step 410, an update package from an information handling system for an inference model is obtained. Prior to step 410, the information handling system may have encountered an inference model update event which may trigger generation of the update package. The information handling system may have generated the update package.

The update package may include (i) the result (e.g., an unlabeled data update) of an update calculation for the inference model with respect to a portion of unlabeled data (e.g., a target domain) and/or (ii) an identifier (e.g., usable by the information handling system manager to obtain a copy of the inference model) for the inference model and/or a copy of the inference model. The update calculation may be based on an inference model update definition associated with the inference model.

The update package may be obtained by, for example, receiving it as part of one or more messages, pulling down a copy of it by virtue of a publish-subscribe system, and/or via other mechanisms.

The inference model may be any type of inference model (e.g., labeled data adapted or hybrid data adapted or other type) without departing from the invention.

In step 412, a labeled data update calculation is performed to obtain a labeled data update for the inference model. The labeled data update may be based on (e.g., used as input) only labeled data. In contrast, the unlabeled data update may only be based on (e.g., used as input) unlabeled data hosted by the information handling system.

In step 414, the inference model is updated using (i) the labeled data update, (ii) an unlabeled data update included in the update package, and (iii) the inference model to obtain a hybrid data adapted inference model. The inference model may be updated by retraining the inference model using the processes described with respect to FIGS. 2.1-3.2. The hybrid data adapted inference model may be better able to accurately identify features in data similar to those of the unlabeled data used to obtain the unlabeled data update.

In step 416, the hybrid data adapted inference model is provided to the information handling system. The hybrid data adapted inference model may be provided to the information handling system via message passing, publish-subscribe systems, or any other method for disseminating information without departing from the invention.

The method may end following step 416.

Using the method illustrated in FIG. 4.2, inference models may be updated in a manner that does not require that unlabeled data be transferred between devices. Consequently, the privacy of the unlabeled data may not be impacted and the quantity of communications resources required for updating an inference model may be reduced when compared to transferring unlabeled data for inference model update purposes.

Turning to FIG. 5, FIG. 5 shows a flowchart of a method in accordance with one or more embodiments of the invention. The method depicted in FIG. 5 may be performed to identify features in unlabeled data in accordance with one or more embodiments of the invention. The method shown in FIG. 5 may be performed by, for example, an information handling system (e.g., 110, FIGS. 1.1 and 1.2). Other components of the system in FIGS. 1.1 and 1.2 may perform all, or a portion, of the method of FIG. 5 without departing from the invention.

While FIG. 5 is illustrated as a series of steps, any of the steps may be omitted, performed in a different order, additional steps may be included, and/or any or all of the steps may be performed in a parallel and/or partially overlapping manner without departing from the invention.

In step 500, an inference model is obtained. The inference model may be obtained from an information handling system manager. An inference model update definition for the inference model may also be obtained. The inference model and inference model update definition may be obtained via message passing, publish-subscribe systems, or any other method for disseminating information without departing from the invention. The inference model may be, for example, a labeled data based inference model or a hybrid data adapted inference model.

In step 502, inferences using (i) the inference model and (ii) unlabeled data are obtained. The inferences may be obtained by using the unlabeled data as input to the inference model. The inferences may specify features included in the unlabeled data.

In step 504, the occurrence of an inference model update event is identified. The occurrence may be identified by performing one or more calculations specified by the inference model update definition. For example, the inference model update definition may specify a series of actions that when performed identify whether the inference model is accurately identifying features in the unlabeled data. The inference model update event may be when the inference model is identified as not accurately identifying the features in the unlabeled data.

In step 506, an inference model update package is generated using (i) the inference model update definition and (ii) unlabeled data. The inference model update package may be obtained by performing one or more actions specified by the inference model update definition. These actions may include performing one or more calculations using the unlabeled data to obtain an unlabeled data update, adding the unlabeled data update to the inference model update package, adding an identifier and/or copy of the inference model to the inference model update package, and/or adding other information to the inference model update package.

In step 508, the inference model update package is provided to an information handling system manager (e.g., that generated and/or has access to the inference model and/or labeled data upon which the inference model is based). The update package may be provided via message passing, publish-subscribe systems, or any other method for disseminating information without departing from the invention.

In step 510, a hybrid data adapted inference model based on (i) the inference model, (ii) the inference model update package, and (iii) the labeled data used to train the inference model is obtained from the information handling system manager. The hybrid data adapted inference model may be obtained by updating the inference model using the unlabeled data update from the inference model update package and a labeled data update calculated using the labeled data, as discussed with respect to FIGS. 2.1-3.2.

In step 512, second inferences are obtained using (i) the hybrid data adapted inference model and (ii) the unlabeled data. The second inferences may be obtained by using the unlabeled data as input to the hybrid data adapted inference model. The second inferences may specify features included in the unlabeled data. The features specified by the second inferences may be more accurately identified than features identified using the inference model.

The method may end following step 512. Using the method illustrated in FIG. 5, inference models may be updated to provide more accurate feature identification services while avoiding sending copies of unlabeled data to other entities. By doing so, the privacy of the unlabeled data may be maintained and the communications resources used to update the inference models may be reduced when compared to methods of updating inference models that may include moving unlabeled data between devices (e.g., because the results of calculations performed for update purposes on the unlabeled data may be much smaller in size than the unlabeled data).

To further clarify embodiments of the invention, a non-limiting example is provided in FIGS. 6.1-6.4. These figures illustrate diagrams of the operation of systems similar to that of FIGS. 1.1 and 1.2 over time.

EXAMPLE

Consider a scenario in which an information handling system is integrated into a car (650) located in sunny Texas. To provide automated navigation services, the information handling system may utilize images of the surrounding environment captured using any number of cameras as well as types of environmental information captured using other sensors. The captured images may include features relevant for determining how to provide the navigation services (e.g., provided by a navigation application hosted by the information handling system).

To enable the information handling system to identify the features in the car, a data center (600) may use labeled pictures taken by similar cars in the Texas region also exposed to generally sunny environmental conditions to generate a labeled data based inference model (614) and an inference model update definition (612) for the car (650). The resulting labeled data based inference model (614) is able to identify features in images with high accuracy so long as the images are of scenes with similar, sunny environmental conditions.

The data center (600) may transfer the model and definition to the information handling system hosted by the car (650) via a connection (602). The connection (602) may include a wireless network that provides the car (650) with limited communications capabilities. Consequently, it may not be possible to transfer significant amounts of data to and from the car (650).

After the information handling system of the car (650) obtains the labeled data based inference model (614), it begins to processes unlabeled pictures (652) to obtain inferences (654) that specify features included in the unlabeled pictures. Consequently, the navigation services provided by the information handling system (e.g., route planning, driver alerts due to road conditions, etc.) may be improved based on the accurate feature identification provided by the inference model.

After successfully providing navigation services using the identified features, the owner of the car (650) moves to Washington state in the pacific north west. Turning to FIG. 6.2, the information handling system in the car (650) continues to use the labeled data based inference model (614) to identify features included in second unlabeled pictures (656) taken while in Washington. However, due to the rainy conditions in Washington, the second unlabeled pictures (656) are substantially different from the labeled pictures (610). Consequently, the second inferences (658) made for the second unlabeled pictures (656) inaccurately identify features included in the second unlabeled pictures (656). Accordingly, the provided navigation services are of poorer quality (e.g., less accurate).

Turning to FIG. 6.3, based on the poorer quality of inferences, the information handling system initiates a retraining of the inference model. To do so, it generates an update package (660) by performing predetermined processing of the second unlabeled pictures (656) based on actions specified by the inference model update definition (612). The update package (660) is then provided to the data center which it uses, along with the labeled pictures (610) to generate a hybrid data adapted inference model (616). By virtue of being based in part on the update package, the hybrid data adapted inference model (616) is better able to identify features in images having (e.g., rainy environmental conditions) a character similar to that of the second unlabeled pictures (656).

Turning to FIG. 6.4, the data center (600) provides the information handling system with the hybrid data adapted inference model (616) via the connection (602). Once obtained, the information handling system processes third unlabeled pictures (662) to obtain third inferences (664). Because the third unlabeled pictures (662) are similar in character to the second unlabeled pictures, the third inferences (664) accurately specify the features included in the third unlabeled pictures (662).

Accordingly, the navigation services provided by the information handling system are returned to a desired level of quality by virtue of having access to the accurately identified features.

End of Example

Thus, as illustrated in FIGS. 6.1-6.4, embodiments of the invention may provide a method for accurately identifying features in unlabeled data even as the character of the unlabeled data deviates from that of the data on which the inference model used to identify the features is based. Further, as seen in FIGS. 6.2-6.4, the process of maintaining the accuracy of identifying features in the unlabeled data does not require sending of any of the unlabeled data to other devices. Consequently, the privacy of the unlabeled data may be maintained while also conserving the limited communications resources of the connection between the information handling system and other devices.

FIG. 7.1 shows a flowchart of a method in accordance with one or more embodiments of the invention. The method depicted in FIG. 7.1 may be performed to provide labeled data adapted inference models to information handling systems in accordance with one or more embodiments of the invention. The method shown in FIG. 7.1 may be performed by, for example, an edge IHS manager (e.g., 124, FIG. 1.2). Other components of the systems in FIG. 1.2 may perform all, or a portion, of the method of FIG. 7.1 without departing from the invention.

While FIG. 7.1 is illustrated as a series of steps, any of the steps may be omitted, performed in a different order, additional steps may be included, and/or any or all of the steps may be performed in a parallel and/or partially overlapping manner without departing from the invention.

In step 700, the edge IHS manager receives an inference model request for a vehicle to update an inference model. The inference model request may be transmitted from any vehicle operating within the region covered by the edge IHS manager. Additionally, the inference model request may include vehicle information (e.g., a unique identifier (ID) set by an administrator of the systems of FIGS. 1.1 and 1.2, the vehicle's vehicle identification number (VIN), etc.) and an inference model to be trained/updated. The inference model request may also include any of the components included in the update package as discussed above in FIG. 4.2.

In step 702, upon receiving the inference model request, a current use threshold is generated using the inference model request. The current use threshold replaces an existing use threshold stored in the edge IHS manager every time the edge IHS manager receives a new inference model request, and is based on a number of active vehicles currently in communication with and requesting inference model updates with the edge IHS manager. The details of how the current use threshold is generated are discussed below in the flowchart of FIG. 7.2.

In step 704, the inference model included in the inference model update request is updated by the edge IHS manager using one or more stored labeled data. In particular, the edge IHS manager updates the inference model using all of the labeled data stored in the labeled data storage (e.g., 399, FIG. 3.4). Alternatively, the inference framework manager (e.g., 302, FIG. 3.3) of the edge IHS manager randomly selects one or more stored labeled data from the labeled data storage to update the inference model in the inference model update request. The inference model is updated using the stored label data similarly to the process discussed above in the flowchart of FIG. 4.2.

In step 706, a use counter associated with the stored labeled data used to update the inference model is incremented. The use counters of used labeled data are incremented by the labeled data storage manager (e.g., 304, FIG. 3.3) upon detecting that the labeled data are used by the inference framework manager to update the inference model. This incrementing of the use counters helps the labeled data storage manager keep track of how often a particular stored labeled data is used to update an inference model. Because the edge IHS manager is able to store less labeled data than the central IHS manager (e.g., 120, FIG. 1.1; 122, FIG. 1.2), the use counter minimizes the chances of the same stored labeled data (or batch of labeled data) being used multiple times for training a same inference model. Additional details showing how the use counter is incremented are discussed below in FIGS. 8.1-8.2.

In step 708, a determination is made to determine whether the use counter of any stored labeled data has exceeded the current use threshold calculated in step 702. The current use threshold is a user-defined threshold representing a maximum number of times a stored labeled data can be used to train an inference model before it needs to be replaced with a new stored labeled data from the central IHS manager. As discussed above, this minimizes the chances of the same stored labeled data (or batch of labeled data) being used multiple times for training a same inference model due to the limited storage capabilities of the edge IHS manager.

If it is determined that none of the use counters exceed the current use threshold (i.e., NO in step 708), all of the stored labeled data in the labeled data storage are maintained in step 710 for use to train subsequently received inference models. Alternatively, if it is determined that one or more of the use counters exceed the current use threshold (i.e., YES in step 708), the labeled data storage manager of edge IHS manager moves (in step 712) the pointers associated with respective stored labeled data with use counters exceeding the current use threshold from a pointer array (e.g., 397, FIG. 3.4) to an update pool (e.g., 393, FIG. 3.4). All pointers moved to the update pool indicate stored labeled data that are intended to be deleted from the edge IHS manager after being replaced by new labeled data from the central IHS manager. As discussed above, the determination of whether any use counters exceed the current use threshold is made by the labeled data storage manager of the edge IHS manager.

In step 714, all labeled data associated with pointers in the update pool are replaced with new labeled data. As discussed above, the labeled data storage manager of the edge IHS manager communicates with the central IHS manager to retrieve the new labeled data for replacing all labeled data associated with pointers moved to the update pool of the edge IHS manager. The replacement of the labeled data are discussed in more detail in FIG. 7.3.

FIG. 7.2 shows a flowchart of a method in accordance with one or more embodiments of the invention. The method depicted in FIG. 7.2 may be performed to provide labeled data adapted inference models to information handling systems in accordance with one or more embodiments of the invention. The method shown in FIG. 7.2 may be performed by, for example, an edge IHS manager (e.g., 124, FIG. 1.2). Other components of the systems in FIG. 1.2 may perform all, or a portion, of the method of FIG. 7.2 without departing from the invention.

While FIG. 7.2 is illustrated as a series of steps, any of the steps may be omitted, performed in a different order, additional steps may be included, and/or any or all of the steps may be performed in a parallel and/or partially overlapping manner without departing from the invention.

In step 720, the inference model update request is parsed for a vehicle information. The vehicle information is associated with and unique to the vehicle that transmitted the inference model update request. As discussed above, the vehicle information may be a unique identifier (ID) set by an administrator of the systems of FIGS. 1.1 and 1.2, the vehicle's vehicle identification number (VIN), etc. The inference model update request may be the update package as discussed above in FIG. 4.2.

In step 724, an active vehicle timestamp list (e.g., 387, FIG. 3.4) is updated using the vehicle information. In particular, in one or more embodiments disclosed herein, the vehicle information is first stored in a vehicle information storage (e.g., 389, FIG. 3.4) of a vehicle counter (e.g., 391, FIG. 3.4) in the storage of the edge IHS manager.

In one or more embodiments disclosed herein, the vehicle information may additionally include a timestamp of the inference model update request (i.e., a string of numbers indicating when the inference model update request was received by the edge IHS manager). The vehicle information is then hashed to be mapped to a position on the active vehicle timestamp list based on the timestamp of the inference model update request. This allows the active vehicle timestamp list to maintain an updated list of active vehicles in communication with and requesting inference model updates from the edge IHS manager. In one or more embodiments disclosed herein, the updated list of active vehicles may be maintained in chronological order starting with a least recently used (lru) vehicle to a most recently used (mm) vehicle.

In step 726, the active vehicle timestamp list updated in step 724 (i.e., the updated active vehicle timestamp list) is parsed to determine a number of active vehicles. The updated active vehicle timestamp list may be parsed by the labeled data storage manager of the edge IHS manager. In one or more embodiments disclosed herein, the labeled data storage manager may parse an entirety of the active vehicle timestamp list. Alternatively, the labeled data storage manager may only parse a portion of the active vehicle timestamp list. The portion of the active vehicle timestamp list to be parsed is based on a time window determined by the labeled data storage manager. In one or more embodiments disclosed herein, this time window may be determined using any data included in the inference model update request.

In step 728, an existing use threshold is replaced with the current use threshold. In one or more embodiments, the current use threshold may be generated by the labeled data storage manager each time the edge IHS receives a new inference model update request. In particular, the current use threshold may be generated using the current number of active vehicles determined in step 726 and a preset aggression value. For example, following Equation (1) may be used to determine the current use threshold where $T_r$ is the current use threshold, $N_\mu$ is the current number of active vehicles, and a is an aggression value that determines how aggressively the edge IHS manager replace stored labeled data with new labeled data.

$$T_r = |N_\mu| \times \alpha \qquad \text{(Equation 1)}$$

In one or more embodiments disclosed herein, the aggression value a may be preset by an administrator of the edge IHS manager. For example, the edge IHS manger may store a list of aggression values each associated with a number of active vehicles; the higher the number of active vehicles, the lower the aggression value. This advantageously minimizes the chances of the same stored labeled data (or batch of labeled data) being used multiple times for training a same inference model due to the limited storage capabilities of the edge IHS manager.

FIG. 7.3 shows a flowchart of a method in accordance with one or more embodiments of the invention. The method depicted in FIG. 7.2 may be performed to provide labeled data adapted inference models to information handling systems in accordance with one or more embodiments of the invention. The method shown in FIG. 7.3 may be performed by, for example, an edge IHS manager (e.g., 124, FIG. 1.2). Other components of the systems in FIG. 1.2 may perform all, or a portion, of the method of FIG. 7.3 without departing from the invention.

While FIG. 7.3 is illustrated as a series of steps, any of the steps may be omitted, performed in a different order, additional steps may be included, and/or any or all of the steps may be performed in a parallel and/or partially overlapping manner without departing from the invention.

In step 740, a labeled data retrieval request is transmitted to a central IHS manager. This labeled data retrieval request is based on the number of pointers in the update pool of the edge IHS manager. In particular, as discussed above, the labeled data storage manager of the edge IHS manager may parse the update pool to determine a number of pointers currently being stored in the update pool. The labeled data storage manager then determines that all labeled data associated with pointers in the update pool needs to be replaced with new labeled data from the central IHS manager and generates the labeled data retrieval request including a request number equivalent to the number of pointers stored in the update pool.

In step 742, in response to the transmission of the labeled data retrieval request, new labeled data is received from the central IHS manager. The new labeled data may be transmitted by the central IHS manager in any form (i.e., separately in multiple data packets, in one or more combinations using multiple data packets, all in a single data packet, etc.). In one or more embodiments disclosed herein, the new labeled data should be different from all of the labeled data being replaced.

In step 744, the labeled data stored in the update pool of the edge IHS manager is deleted and the new labeled data is stored in the labeled data storage of the edge IHS manager. In one or more embodiments disclosed herein, the labeled data storage manager of the edge IHS manager may delete (i.e., remove permanently from the storage of the edge IHS manager) the labeled data associated with the pointer in the update pool from the labeled data storage after the transmission of the labeled data retrieval request and before the reception of the new labeled data.

In step 746, the new labeled data in the labeled data storage is assigned the pointer in the update pool. This may be performed by the labeled data storage manager of the edge IHS manager. In particular, in one or more embodiments disclosed herein, the edge IHS manager may assign a pointer that has been freed up (i.e., a pointer that is no longer in use) as a result of labeled data being deleted from the labeled data storage to the new labeled data in the labeled data storage. If multiple labeled data were deleted from the labeled data storage, the labeled data storage manager may assign the freed up pointers using any method as long as each labeled data in the labeled data storage is ultimately assigned to a single unique pointer.

In one or more embodiments disclosed herein, after a pointer is assigned to a new labeled data, the pointer counter (i.e., the use counter discussed above) associated with the pointer is reset to zero (0). Alternatively, the pointer counter may be reset to zero upon deletion of the labeled data associated with its respective pointer.

Although all of the steps in FIGS. 7.1-7.3 are described with respect to a vehicle as an example of the information handling system, one of ordinary skill in the art would appreciate that any device/system (i.e., a personal computer, a smartphone, an airplane, etc.) can be the information handling system.

To further clarify embodiments of the invention, a non-limiting example is provided in FIGS. 8.1-8.2. These figures illustrate diagrams of the operation of an edge IHS manager (e.g., 124, FIG. 1.2) over time.

Example

Consider a scenario in FIG. 8.1 which a new edge data center (800) (e.g., 124, FIG. 1.2) has just been set up (i.e., deployed) for a new region. Labeled data stored (804) (e.g., 399, FIG. 3.4) in an edge IHS labeled data repository (802) (e.g., 322, FIG. 3.3) of the edge data center (800) is initialized to include a set of labeled pictures (806A, 806N). The edge IHS labeled data repository (802) is also initialized to include: (i) a pointer array (808) (e.g., 397, FIG. 3.4) storing a plurality of unique pointers (810A, 810X) associated with respective ones of the labeled pictures (806A, 806N); (ii) a pointer counter repository (812) (e.g., 395, FIG. 3.4) storing a counter associated with each of the unique pointers (810A, 810N); and (iii) and an update pool (814) (e.g., 393, FIG. 3.4) that is currently empty.

For example, as shown in FIG. 8.1, pointer A (810A) is associated with labeled pictures A (806A) and a counter in the pointer counter repository (812), pointer B (810B) is associated with labeled pictures B (806B) and another counter in the pointer counter repository (812), and pointer N (810N) is associated with labeled pictures N (806N) and yet another counter in the pointer counter repository (812). Such a configuration shown in FIG. 8.1 sets up the edge data center for updating inference models received from information handling systems.

Now consider a scenario where the edge data center (800) of FIG. 8.1 has been operating for some time. During its time of operation, the edge data center (800) has received multiple inference model update requests. As a result, multiple ones of the labeled pictures (806A, 806N) have been used to train received inference models. In particular, as shown in FIG. 8.2, labeled pictures A (806A) has been used three (3) times to train incoming inference models, labeled pictures B (806B) has been used k times, and labeled pictures N (806N) has not been used at all.

Now let's further assume that k matches a value of the current use threshold stored in the edge IHS labeled data repository (802). Thus, labeled pictures B (806B) has now been used too many times to train incoming inference models. Consequently, as shown in FIG. 8.2, pointer B (810B) associated with labeled pictures B (806B) is moved to the update pool (814). This tells the edge data center (800)

that labeled pictures B (806B) needs to be replaced (i.e., updated) with new and different labeled pictures from a central IHS manager.

End of Example

To further clarify embodiments of the invention, a non-limiting example is provided in FIGS. 9.1-9.2. These figures illustrate diagrams of the operation of an edge IHS manager (e.g., 124, FIG. 1.2) over time.

Example

Consider a scenario in FIG. 9.1 where an information handling system is integrated into a car (902) located in a city of sunny Texas. Further consider that the city is within the region covered by edge data center (900). The car (902) transmits a model update request (990) (i.e., an inference model update request) containing vehicle information (i.e., vehicle C (910C)) to the edge data center 900 over a connection 904 (e.g., a wireless connection). In this scenario, vehicle C (910C) is the vehicle information unique to car (902) that helps edge data center (900) identify the car (902).

Upon receipt of the model update request (990), the edge data center (900) parses the model update request to obtain the vehicle information (i.e., vehicle C (910C)). Once obtained, the vehicle information is stored in a vehicle information storage (908) (e.g., 389, FIG. 3.4) in a vehicle counter (906) (e.g., 391, FIG. 3.4) of the edge data center (900). As also seen in FIG. 9.1, an active vehicle timestamp list (912) (e.g., 387, FIG. 3.4) of the edge data center (900) already includes information about two other vehicles (i.e., vehicle A (910A) and vehicle B (910B)). This indicates that two other cars have previously transmitted model update requests to the edge data center (900).

Consider the same scenario but now vehicle C (910C) has been stored in the vehicle information storage (908), as shown in FIG. 9.2. Since the vehicle information storage (908) and the active vehicle timestamp list (912) operate as a double-linked list, the edge data center (900) adds vehicle C (910C) to the active vehicle timestamp list (912). This now increases the number of active vehicles to three (3) from two (2). Consequently, the edge data center (900) will now use the new active vehicle value of three (3) to generate a current use threshold after the reception of the model update request (990) from car (902).

End Example

To further clarify embodiments of the invention, a non-limiting example is provided in FIGS. 10.1-10.2. These figures illustrate diagrams of the operation of an edge IHS manager (e.g., 124, FIG. 1.2) and central IHS manager (122, FIG. 1.2) over time.

Example

Consider a scenario in FIG. 10.1 where pointer D (1011D) associated with labeled pictures D (1010D) is moved to an update pool (1012) of an edge data center (1004). Consequently, edge data center (1004) notifies a central data center (1000) through a connection (1002) (e.g., wired or wireless) that new labeled pictures from the central data center labeled data repository (1006) are needed to replace labeled pictures D (1010D).

Now consider that the central data center (1000) has transmitted labeled pictures E (1010E) to edge data center (1004) in response to the notification in FIG. 10.1. As shown in FIG. 10.2, labeled picture D (1010D) has been deleted from the storage of the edge data center (1004) and replaced with the labeled pictures E (1010E). Additionally, pointer D (1011D) previously associated with labeled pictures D (1010D) has been removed from the update pool (1012) and is now associated with the newly received and stored labeled pictures E (1010E).

End Example

Figure 11:
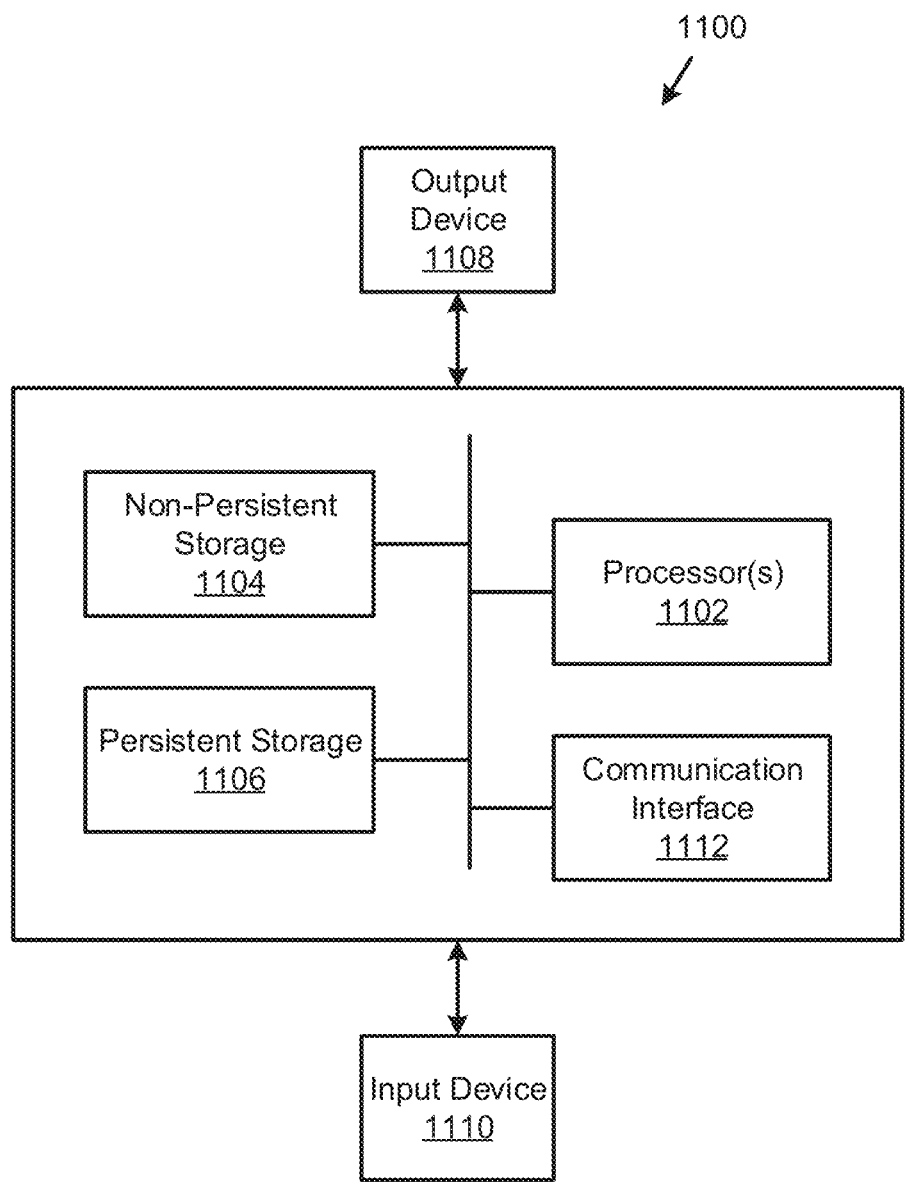
FIG. 11 shows a diagram of a computing device in accordance with one or more embodiments of the invention.

As discussed above, embodiments of the invention may be implemented using computing devices. FIG. 11 shows a diagram of a computing device in accordance with one or more embodiments of the invention. The computing device (1100) may include one or more computer processors (1102), non-persistent storage (1104) (e.g., volatile memory, such as random access memory (RAM), cache memory), persistent storage (1106) (e.g., a hard disk, an optical drive such as a compact disk (CD) drive or digital versatile disk (DVD) drive, a flash memory, etc.), a communication interface (1112) (e.g., Bluetooth interface, infrared interface, network interface, optical interface, etc.), input devices (1110), output devices (1108), and numerous other elements (not shown) and functionalities. Each of these components is described below.

In one embodiment of the invention, the computer processor(s) (1102) may be an integrated circuit for processing instructions. For example, the computer processor(s) may be one or more cores or micro-cores of a processor. The computing device (1100) may also include one or more input devices (1110), such as a touchscreen, keyboard, mouse, microphone, touchpad, electronic pen, or any other type of input device. Further, the communication interface (1112) may include an integrated circuit for connecting the computing device (1100) to a network (not shown) (e.g., a local area network (LAN), a wide area network (WAN) such as the Internet, mobile network, or any other type of network) and/or to another device, such as another computing device.

In one embodiment of the invention, the computing device (1100) may include one or more output devices (1108), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (1102), non-persistent storage (1104), and persistent storage (1106). Many different types of computing devices exist, and the aforementioned input and output device(s) may take other forms.

Embodiments of the invention may provide a system and method for identifying features in unlabeled data. Specifically, embodiments of the invention may provide a system for maintaining the accuracy of feature identification even as the character of the unlabeled data deviates from the data upon which an inference model used to identify the features is based. To do so, a system in accordance with embodiments of the invention may retrain inference models as the data for which features are to be identified changes over time. The process of retraining the inference models may note require sending of any unlabeled data to other devices.

Consequently, the privacy of the unlabeled data may be maintained while also conserving limited communications resources.

Embodiments of the invention may provide a decentralized system for updating inference models. Such a decentralized system may utilize edge servers (i.e., edge IHS managers) at the edges of a network that are physically closer to the actual information handling systems to update inference models. This advantageously reduces network transmission delays of the data being exchanged between the edge servers and the information handling systems compared with the information handling systems sending data directly to a central IHS manager disposed in the network.

Thus, embodiments of the invention may address the problem of feature identification in unlabeled data which may need to remain private.

The problems discussed above should be understood as being examples of problems solved by embodiments of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention. Accordingly, the scope of the invention should be limited only by the attached claims.

What is claimed is:

1. An edge information handling system (IHS) manager, comprising:
 a storage for storing:
  labeled data associated with a use counter, wherein the labeled data is a portion of the labeled data stored in a central IHS; and
  a vehicle counter;
  an update pool; and
 a processor programmed to:
  receive, from an IHS, an update package,
   wherein the update package comprises an unlabeled data update and an identifier corresponding to an inference model,
   wherein the unlabeled data update is a result of an update calculation for the inference model performed by the IHS and using unlabeled data, and
   wherein the unlabeled data is stored on the IHS and is not transmitted to the edge IHS manager;
  update the inference module for the IHS using the labeled data and the update package;
  determine, after the updating, whether the use counter of the labeled data has exceeded a current use threshold, wherein the current use threshold is based on the vehicle counter; and
  in response to the use counter of the labeled data exceeding the current use threshold, initiate replacing of the labeled data with new labeled data from the central IHS,
   wherein the central IHS, the edge IHS manager, and the IHS are operatively connected over a cloud network,
   wherein the central IHS comprises all the labeled data associated with the use counter, and
   wherein replacing of the labeled data with the new labeled data from the central IHS comprises:
    moving a pointer associated with the labeled data to the update pool;
    transmitting, based on determining that the update pool includes the pointer, a new labeled data request to a central IHS manager to retrieve the new labeled data;
    receiving the new labeled data in response to the new labeled data request and deleting the labeled data associated with the pointer in the update pool from the storage; and
    replacing the new labeled data in a portion of the storage previously storing the deleted labeled data to be used for updating subsequently received inference models.

2. The edge IHS manager of claim 1, wherein the updating of the inference model using the labeled data comprises:
 receiving an inference model update request specifying the inference model from a vehicle;
 in response to receiving the inference model update request, updating the inference model using the labeled updating the vehicle counter based on the inference model update request to generate the current use threshold; and
 in response to updating the inference model using the labeled data, updating the use counter of the labeled data by incrementing the user counter.

3. The edge IHS manager of claim 2, wherein
the vehicle counter comprises a vehicle information storage and an active vehicle timestamp list, and
the updating of the vehicle counter based on the inference model update request to generate the current use threshold comprises:
 parsing the inference model update request for a vehicle information of the vehicle;
 storing the vehicle information in the vehicle information storage list;
 updating the active vehicle timestamp list using the vehicle information to generate an updated active vehicle timestamp list;
 parsing the updated active vehicle timestamp list to determine a number of active vehicles requesting inference model updates with the edge IHS manager; and
 replacing a prior use threshold stored in the vehicle counter before the receipt of the inference model update request with the current use threshold.

4. The edge IHS manager of claim 3, wherein
the storage further comprises a plurality of the labeled data each associated with a distinct one of the use counter, and
the processor is further programmed to randomly select one of the labeled data to update the inference model and update the use counter of the randomly selected one of the labeled data.

5. The edge IHS manager of claim 4, wherein
each of the distinct ones of the use counter comprises a pointer associated with a pointer counter,
the pointer counter of a specific labeled data among the plurality of the labeled data is incremented whenever the specific labeled data is randomly selected to update the inference model.

6. The edge IHS manager of claim 1, wherein the new labeled data is assigned the pointer in the update pool.

7. The edge IHS manager of claim 3, wherein
the processor parses only a portion of the updated active vehicle timestamp list to determine the number of active vehicles, and
the portion of the updated active vehicle timestamp list parsed by the processor is determined based on a preset time window.

8. The edge IHS manager of claim 7, wherein the portion of the updated active vehicle timestamp list is parsed starting from an oldest entry within the portion towards a newest entry within the portion.

9. The edge IHS manager of claim 4, wherein the edge IHS manager stores less of the labeled data compared to the central IHS manager.

10. A method for updating labeled data stored in an edge information handling system (IHS) manager, the method comprising:
receiving, from an IHS, an update package,
wherein the update package comprises an unlabeled data update and an identifier corresponding to an inference model,
wherein the unlabeled data update is a result of an update calculation for the inference model performed by the IHS and using unlabeled data, and
wherein the unlabeled data is stored on the IHS and is not transmitted to the edge IHS manager;
updating an inference module for the IHS using the labeled data and the update package, wherein the labeled data is stored in a storage of the edge IHS manager;
determining, after the updating, whether the use counter of the labeled data has exceeded a current use threshold, wherein the current use threshold is based on a vehicle counter stored in the storage; and
in response to the use counter of the labeled data exceeding the current use threshold, initiating replacing of the labeled data with new labeled data from a central IHS,
wherein
the central IHS, the edge IHS manager, and the IHS are operatively connected over a cloud network,
wherein the central IHS comprises:
all the labeled data associated with the use counter; and
wherein replacing of the labeled data with the new labeled data from the central IHS comprises:
moving a pointer associated with the labeled data to the update pool;
transmitting, based on determining that the update pool includes the pointer, a new labeled data request to the central IHS manager to retrieve the new labeled data;
receiving the new labeled data in response to the new labeled data request and deleting the labeled data associated with the pointer in the update pool from the storage; and
replacing the new labeled data in a portion of the storage previously storing the deleted labeled data to be used for updating subsequently received inference models.

11. The method of claim 10, wherein the updating of the inference model using the labeled data comprises:
receiving an inference model update request specifying the inference model from a vehicle;
in response to receiving the inference model update request, updating the inference model using the labeled data and updating the vehicle counter based on the inference model update request to generate the current use threshold; and
in response to updating the inference model using the labeled data, updating the use counter of the labeled data by incrementing the user counter.

12. The method of claim 11, wherein
the vehicle counter comprises a vehicle information storage and an active vehicle timestamp list, and
the updating of the vehicle counter based on the inference model update request to generate the current use threshold comprises:
parsing the inference model update request for a vehicle information of the vehicle;
storing the vehicle information in the vehicle information storage list;
updating the active vehicle timestamp list using the vehicle information to generate an updated active vehicle timestamp list;
parsing the updated active vehicle timestamp list to determine a number of active vehicles requesting inference model updates with the edge IHS manager; and
replacing a prior use threshold stored in the vehicle counter before the receipt of the inference model update request with the current use threshold.

13. The method of claim 12, wherein
the storage further comprises a plurality of the labeled data each associated with a distinct one of the use counter, and
the method further comprises randomly selecting one of the labeled data to update the inference model and update the use counter of the randomly selected one of the labeled data.

14. The method of claim 4, wherein
each of the distinct ones of the use counter comprises a pointer associated with a pointer counter,
the pointer counter of a specific labeled data among the plurality of the labeled data is incremented whenever the specific labeled data is randomly selected to update the inference model.

15. A non-transitory computer readable medium (CRM) comprising computer readable program code, which when executed by a computer processor enables the computer processor to perform a method for updating labeled data stored in an edge information handling system (IHS) manager, the method comprising:
receiving, from an IHS, an update package,
wherein the update package comprises an unlabeled data update and an identifier corresponding to an inference model,
wherein the unlabeled data update is a result of an update calculation for the inference model performed by the IHS and using unlabeled data, and
wherein the unlabeled data is store on the IHS and is not transmitted to the edge IHS manager;
updating an inference module for the IHS using the labeled data and the update package, wherein the labeled data is stored in a storage of the edge IHS manger;
determining, after the updating, whether the use counter of the labeled data has exceeded a current use threshold, wherein the current use threshold is based on a vehicle counter stored in the storage; and in response to the use counter of the labeled data exceeding the current use threshold, initiating replacing of the labeled data with new labeled data from a central IHS, wherein
the central IHS, the edge IHS manager, and the IHS are operatively connecter over a cloud network,
wherein the central IHS comprises:
all the labeled data associated with the use counter; and
wherein replacing of the labeled data with new labeled data from the central IHS comprises:
moving a pointer associated with the labeled data to the update pool;
transmitting, based on determining that the update pool includes the pointer, a new labeled data request to the central IHS manager to retrieve the new labeled data;
receiving the new labeled data in response to the new labeled data request and deleting the labeled data associated with the pointer in the update pool from the storage; and
replacing the new labeled data in a portion of the storage previously storing the deleted labeled data to be used for updating subsequently received inference models.

16. The CRM of claim 15, wherein the updating of the inference model using the labeled data comprises:
receiving an inference model update request specifying the inference model from a vehicle;
in response to receiving the inference model update request, updating the inference model using the labeled data and updating the vehicle counter based on the inference model update request to generate the current use threshold; and
in response to updating the inference model using the labeled data, updating the use counter of the labeled data by incrementing the user counter.

17. The CRM of claim 16, wherein
the vehicle counter comprises a vehicle information storage and an active vehicle timestamp list, and
the updating of the vehicle counter based on the inference model update request to generate the current use threshold comprises:
parsing the inference model update request for a vehicle information of the vehicle;
storing the vehicle information in the vehicle information storage list;
updating the active vehicle timestamp list using the vehicle information to generate an updated active vehicle timestamp list;
parsing the updated active vehicle timestamp list to determine a number of active vehicles requesting inference model updates with the edge IHS manager; and
replacing a prior use threshold stored in the vehicle counter before the receipt of the inference model update request with the current use threshold.

18. The CRM of claim 17, wherein
the storage further comprises a plurality of the labeled data each associated with a distinct one of the use counter, and
the method further comprises randomly selecting one of the labeled data to update the inference model and update the use counter of the randomly selected one of the labeled data.

19. The CRM of claim 18, wherein
each of the distinct ones of the use counter comprises a pointer associated with a pointer counter,
the pointer counter of a specific labeled data among the plurality of the labeled data is incremented whenever the specific labeled data is randomly selected to update the inference model.

\* \* \* \* \*